(12) United States Patent
Bothe et al.

(10) Patent No.: US 10,338,408 B2
(45) Date of Patent: Jul. 2, 2019

(54) METHOD FOR MAKING IMPROVED UV-ABSORBING OPHTHALMIC LENSES

(71) Applicant: Novartis AG, Basel (CH)

(72) Inventors: Harald Bothe, Niedernhausen (DE); Peter Hagmann, Erlenbach am Main (DE)

(73) Assignee: Novartis AG, Basel (CH)

( * ) Notice: Subject to any disclaimer, the term of this patent is extended or adjusted under 35 U.S.C. 154(b) by 736 days.

(21) Appl. No.: 14/106,888

(22) Filed: Dec. 16, 2013

(65) Prior Publication Data
US 2014/0178595 A1     Jun. 26, 2014

Related U.S. Application Data

(60) Provisional application No. 61/738,014, filed on Dec. 17, 2012.

(51) Int. Cl.
| | | |
|---|---|---|
| *G02B 1/04* | (2006.01) | |
| *G02C 7/04* | (2006.01) | |
| *B29D 11/00* | (2006.01) | |

(52) U.S. Cl.
CPC ........ *G02C 7/049* (2013.01); *B29D 11/00865* (2013.01); *G02B 1/043* (2013.01)

(58) Field of Classification Search
CPC ... G02C 7/049; B29D 11/00865; G02B 1/043
USPC .................................................. 427/162–169
See application file for complete search history.

(56) References Cited

U.S. PATENT DOCUMENTS

| | | | |
|---|---|---|---|
| 2,296,891 A | 9/1942 | Andersen | |
| 2,926,154 A | 2/1960 | Keim | |
| 3,162,676 A | 12/1964 | Goldberg | |
| 3,224,986 A | 12/1965 | Butler | |
| 3,299,173 A | 1/1967 | Roselli | |
| 3,399,173 A | 8/1968 | Heller | |
| 3,408,429 A | 10/1968 | Wichterle | |
| 3,434,984 A | 3/1969 | Hyland, Jr. | |
| 3,488,327 A | 1/1970 | Kollinsky | |
| 3,566,874 A | 3/1971 | Shepherd | |
| 3,583,950 A | 6/1971 | Kollinsky | |
| 3,598,790 A | 8/1971 | Kollinsky | |
| 3,609,126 A | 9/1971 | Asao | |
| 3,616,935 A | 11/1971 | Love | |

(Continued)

FOREIGN PATENT DOCUMENTS

| | | |
|---|---|---|
| CA | 2378841 C | 1/2007 |
| EP | 0032443 A2 | 7/1981 |

(Continued)

OTHER PUBLICATIONS

ACS Reference, https://www.organicdivision.org/orig/organic_solvents.html, accessed online Aug. 19, 2016.*

(Continued)

*Primary Examiner* — Michael P Wieczorek
*Assistant Examiner* — Michael G Miller
(74) *Attorney, Agent, or Firm* — Jian Zhou

(57) ABSTRACT

Described herein is a cost-effective and time-efficient method for making UV-absorbing contact lenses. In contrast to the conventional method for making UV-absorbing contact lenses which involves copolymerizing a lens forming composition including a UV-absorbing vinylic monomer, a method of the invention involves dipping a contact lens in a solution of UV-absorbing polymer comprising carboxyl-containing monomeric units, UV-absorbing monomeric units and covalently bound radical-initiating moieties to form a UV-absorbing coating on the contact lens.

20 Claims, 1 Drawing Sheet

(56) References Cited

U.S. PATENT DOCUMENTS

| | | |
|---|---|---|
| 3,617,344 A | 11/1971 | Leininger |
| 3,634,123 A | 1/1972 | Eriksson |
| 3,639,141 A | 2/1972 | Dyck |
| 3,663,288 A | 5/1972 | Miller |
| 3,695,921 A | 10/1972 | Shepherd |
| 3,700,623 A | 10/1972 | Keim |
| 3,717,502 A | 2/1973 | Masuhara |
| 3,772,076 A | 11/1973 | Keim |
| 3,813,695 A | 6/1974 | Podell, Jr. |
| 3,844,989 A | 10/1974 | Harumiya |
| 3,861,396 A | 1/1975 | Vaillancourt |
| 3,895,166 A | 7/1975 | Wood |
| 3,900,672 A | 8/1975 | Hammond |
| 3,925,178 A | 12/1975 | Gesser |
| 3,974,131 A | 8/1976 | Puskas |
| 3,975,350 A | 8/1976 | Hudgin |
| 4,060,657 A | 11/1977 | Iwami |
| 4,118,485 A | 10/1978 | Eriksson |
| 4,132,695 A | 1/1979 | Burkholder |
| 4,136,250 A | 1/1979 | Mueller |
| 4,143,949 A | 3/1979 | Chen |
| 4,153,641 A | 5/1979 | Deichert |
| 4,154,898 A | 5/1979 | Burkholder, Jr. |
| 4,168,112 A | 9/1979 | Ellis |
| 4,182,822 A | 1/1980 | Chang |
| 4,189,546 A | 2/1980 | Deichert |
| 4,191,596 A | 3/1980 | Dollman |
| 4,217,038 A | 8/1980 | Letter |
| 4,229,838 A | 10/1980 | Mano |
| 4,254,248 A | 3/1981 | Friends |
| 4,259,467 A | 3/1981 | Keogh |
| 4,260,725 A | 4/1981 | Keogh |
| 4,261,875 A | 4/1981 | LeBoeuf |
| 4,263,188 A | 4/1981 | Hampton |
| 4,276,402 A | 6/1981 | Chromecek |
| 4,280,970 A | 7/1981 | Kesting |
| 4,293,642 A | 10/1981 | Beavan |
| 4,298,639 A | 11/1981 | Van Eenam |
| 4,298,715 A | 11/1981 | Van Eenam |
| 4,304,895 A | 12/1981 | Loshaek |
| 4,312,575 A | 1/1982 | Peyman |
| 4,321,261 A | 3/1982 | Ellis |
| 4,327,203 A | 4/1982 | Deichert |
| 4,341,889 A | 7/1982 | Deichert |
| 4,343,927 A | 8/1982 | Chang |
| 4,347,198 A | 8/1982 | Ohkada |
| 4,355,147 A | 10/1982 | Deichert |
| 4,373,009 A | 2/1983 | Winn |
| 4,379,893 A | 4/1983 | O'Malley |
| 4,427,823 A | 1/1984 | Inagaki |
| 4,444,711 A | 4/1984 | Schad |
| 4,450,045 A | 5/1984 | Hertel |
| 4,460,534 A | 7/1984 | Boehm |
| 4,462,665 A | 7/1984 | Shah |
| 4,485,236 A | 11/1984 | Rasmussen |
| 4,486,577 A | 12/1984 | Mueller |
| 4,487,808 A | 12/1984 | Lambert |
| 4,495,313 A | 1/1985 | Larsen |
| 4,499,154 A | 2/1985 | James |
| 4,521,564 A | 6/1985 | Solomon |
| 4,527,293 A | 7/1985 | Eckstein |
| 4,528,311 A | 7/1985 | Beard |
| 4,543,398 A | 9/1985 | Bany |
| 4,546,123 A | 10/1985 | Schäfer |
| 4,548,844 A | 10/1985 | Podell |
| 4,565,740 A | 1/1986 | Gölander |
| 4,575,476 A | 3/1986 | Podell |
| 4,605,712 A | 8/1986 | Mueller |
| 4,612,358 A | 9/1986 | Besecke |
| 4,613,665 A | 9/1986 | Larm |
| 4,631,072 A | 12/1986 | Koller |
| 4,661,575 A | 4/1987 | Tom |
| 4,684,538 A | 8/1987 | Klemarczyk |
| 4,695,608 A | 9/1987 | Engler |
| 4,703,097 A | 10/1987 | Wingler |
| 4,711,943 A | 12/1987 | Harvey, III |
| 4,716,234 A | 12/1987 | Dunks |
| 4,720,512 A | 1/1988 | Hu |
| 4,734,475 A | 3/1988 | Goldenberg |
| 4,786,556 A | 11/1988 | Hu |
| 4,791,175 A | 12/1988 | Janssen |
| 4,833,218 A | 5/1989 | Lee |
| 4,837,289 A | 6/1989 | Mueller |
| 4,861,916 A | 8/1989 | Köhler |
| 4,876,126 A | 10/1989 | Takemura |
| 4,892,402 A | 1/1990 | Sawamoto |
| 4,895,896 A | 1/1990 | Müller-Lierheim |
| 4,920,184 A | 4/1990 | Schäfer |
| 4,941,997 A | 7/1990 | Decher |
| 4,943,460 A | 7/1990 | Markle |
| 4,954,586 A | 9/1990 | Toyoshima |
| 4,954,587 A | 9/1990 | Mueller |
| 4,959,074 A | 9/1990 | Halpern |
| 4,968,532 A | 11/1990 | Janssen |
| 4,973,359 A | 11/1990 | Yamasoe |
| 4,973,429 A | 11/1990 | Decher |
| 4,973,493 A | 11/1990 | Guire |
| RE33,477 E | 12/1990 | Loshaek |
| 4,978,481 A | 12/1990 | Janssen |
| 4,979,959 A | 12/1990 | Guire |
| 4,985,559 A | 1/1991 | Goldberg |
| 4,990,357 A | 2/1991 | Karakelle |
| 5,002,582 A | 3/1991 | Guire |
| 5,010,141 A | 4/1991 | Mueller |
| 5,019,393 A | 5/1991 | Ito |
| 5,034,461 A | 7/1991 | Lai |
| 5,039,459 A | 8/1991 | Kindt-Larsen |
| 5,039,761 A | 8/1991 | Ono |
| 5,045,573 A | 9/1991 | Köhler |
| 5,049,403 A | 9/1991 | Larm |
| 5,053,048 A | 10/1991 | Pinchuk |
| 5,061,738 A | 10/1991 | Soloman |
| 5,068,318 A | 11/1991 | Decher |
| 5,070,170 A | 12/1991 | Robertson |
| 5,079,093 A | 1/1992 | Akashi |
| 5,079,319 A | 1/1992 | Mueller |
| 5,080,924 A | 1/1992 | Kamel |
| 5,091,205 A | 2/1992 | Fan |
| 5,108,776 A | 4/1992 | Goldberg |
| 5,112,900 A | 5/1992 | Buddenhagen |
| 5,132,108 A | 7/1992 | Narayanan |
| 5,135,297 A | 8/1992 | Valint, Jr. |
| 5,135,516 A | 8/1992 | Sahatjian |
| 5,155,194 A | 10/1992 | Kossmehl |
| 5,160,790 A | 11/1992 | Elton |
| 5,165,919 A | 11/1992 | Sasaki |
| 5,194,544 A | 3/1993 | Goldberg |
| 5,208,111 A | 5/1993 | Decher |
| 5,210,111 A | 5/1993 | Goldenberg |
| 5,214,452 A | 5/1993 | Kossmehl |
| 5,217,492 A | 6/1993 | Guire |
| 5,229,211 A | 7/1993 | Murayama |
| 5,262,484 A | 11/1993 | Coleman |
| 5,263,992 A | 11/1993 | Guire |
| 5,270,046 A | 12/1993 | Sakamoto |
| 5,272,012 A | 12/1993 | Opolski |
| 5,290,548 A | 3/1994 | Goldberg |
| 5,290,585 A | 3/1994 | Elton |
| 5,292,514 A | 3/1994 | Capecchi |
| 5,308,641 A | 5/1994 | Cahalan |
| 5,312,873 A | 5/1994 | Gregor |
| 5,336,797 A | 8/1994 | McGee |
| 5,346,946 A | 9/1994 | Yokoyama |
| 5,348,873 A | 9/1994 | Matsuda |
| 5,350,800 A | 9/1994 | Verhoeven |
| 5,352,714 A | 10/1994 | Lai |
| 5,355,213 A | 10/1994 | Dotan |
| 5,358,995 A | 10/1994 | Lai |
| 5,387,632 A | 2/1995 | Lai |
| 5,397,848 A | 3/1995 | Yang |
| 5,407,715 A | 4/1995 | Buddenhagen |
| 5,408,002 A | 4/1995 | Coleman |
| 5,408,280 A | 4/1995 | von der Haegen |
| 5,409,731 A | 4/1995 | Nakagawa |

(56) References Cited

U.S. PATENT DOCUMENTS

| | | | | |
|---|---|---|---|---|
| 5,416,131 | A | 5/1995 | Wolff | |
| 5,416,132 | A | 5/1995 | Yokoyama | |
| 5,417,969 | A | 5/1995 | Hsu | |
| 5,438,080 | A * | 8/1995 | Ohama | C08G 18/633 522/174 |
| 5,441,488 | A | 8/1995 | Shimura | |
| 5,442,402 | A | 8/1995 | Sohn | |
| 5,443,907 | A | 8/1995 | Slaikeu | |
| 5,451,617 | A | 9/1995 | Lai | |
| 5,461,433 | A | 10/1995 | Nakabayashi | |
| 5,470,944 | A | 11/1995 | Bonsignore | |
| 5,475,450 | A | 12/1995 | Meadows | |
| 5,476,665 | A | 12/1995 | Dennison | |
| 5,486,579 | A | 1/1996 | Lai | |
| 5,500,732 | A | 3/1996 | Ebel | |
| 5,508,317 | A | 4/1996 | Müller | |
| 5,509,899 | A | 4/1996 | Fan | |
| 5,510,004 | A | 4/1996 | Allen | |
| 5,510,418 | A | 4/1996 | Rhee | |
| 5,518,767 | A | 5/1996 | Rubner | |
| 5,527,925 | A | 6/1996 | Chabrecek | |
| 5,528,357 | A | 6/1996 | Davis | |
| 5,529,727 | A | 6/1996 | LaBombard | |
| 5,532,311 | A | 7/1996 | Sirvio | |
| 5,536,573 | A | 7/1996 | Rubner | |
| 5,562,922 | A | 10/1996 | Lambert | |
| 5,563,056 | A | 10/1996 | Swan | |
| 5,574,554 | A | 11/1996 | Su | |
| 5,578,675 | A | 11/1996 | Mormile | |
| 5,583,163 | A | 12/1996 | Müller | |
| 5,584,882 | A | 12/1996 | Yabushita | |
| 5,591,140 | A | 1/1997 | Narayanan | |
| 5,597,873 | A | 1/1997 | Chambers | |
| 5,599,576 | A | 2/1997 | Opolski | |
| 5,612,389 | A | 3/1997 | Chabrecek | |
| 5,612,391 | A | 3/1997 | Chabrecek | |
| 5,614,035 | A | 3/1997 | Nadkarni | |
| 5,620,738 | A | 4/1997 | Fan | |
| 5,621,018 | A | 4/1997 | Chabrecek | |
| 5,626,000 | A | 5/1997 | Edwards | |
| 5,633,504 | A | 5/1997 | Collins | |
| 5,637,726 | A | 6/1997 | Collins | |
| 5,648,442 | A | 7/1997 | Bowers | |
| 5,670,558 | A | 9/1997 | Onishi | |
| 5,672,638 | A | 9/1997 | Verhoeven | |
| 5,674,942 | A | 10/1997 | Hill | |
| 5,681,510 | A | 10/1997 | Valint, Jr. | |
| 5,688,855 | A | 11/1997 | Stoy | |
| 5,693,034 | A | 12/1997 | Buscemi | |
| 5,700,559 | A | 12/1997 | Sheu | |
| 5,702,754 | A | 12/1997 | Zhong | |
| 5,705,583 | A | 1/1998 | Bowers | |
| 5,710,302 | A | 1/1998 | Kunzler | |
| 5,712,326 | A | 1/1998 | Jones | |
| 5,712,327 | A | 1/1998 | Chang | |
| 5,712,356 | A | 1/1998 | Bothe | |
| 5,717,781 | A | 2/1998 | Ebel | |
| 5,719,669 | A | 2/1998 | Ross, III | |
| 5,723,145 | A | 3/1998 | Shikinami | |
| 5,731,087 | A | 3/1998 | Fan | |
| 5,739,236 | A | 4/1998 | Bowers | |
| 5,748,300 | A | 5/1998 | Wilder | |
| 5,760,100 | A | 6/1998 | Nicolson | |
| 5,766,158 | A | 6/1998 | Opolski | |
| 5,776,999 | A | 7/1998 | Nicolson | |
| 5,779,943 | A | 7/1998 | Enns | |
| 5,783,650 | A | 7/1998 | Bowers | |
| 5,789,461 | A | 8/1998 | Nicolson | |
| 5,789,462 | A | 8/1998 | Motani | |
| 5,789,464 | A | 8/1998 | Müller | |
| 5,792,531 | A | 8/1998 | Littleton | |
| 5,800,412 | A | 9/1998 | Zhang | |
| 5,801,822 | A | 9/1998 | Lafferty | |
| 5,804,318 | A | 9/1998 | Pinchuk | |
| 5,805,264 | A | 9/1998 | Janssen | |
| 5,805,276 | A | 9/1998 | Davis | |
| 5,807,636 | A | 9/1998 | Sheu | |
| 5,807,944 | A | 9/1998 | Hirt | |
| 5,811,151 | A | 9/1998 | Hendriks | |
| 5,818,573 | A | 10/1998 | Lafferty | |
| 5,828,446 | A | 10/1998 | Davis | |
| 5,843,346 | A | 12/1998 | Morrill | |
| 5,849,810 | A | 12/1998 | Müller | |
| 5,849,811 | A | 12/1998 | Nicolson | |
| 5,855,825 | A | 1/1999 | Ito | |
| 5,858,653 | A | 1/1999 | Duran | |
| 5,859,107 | A | 1/1999 | Jones | |
| 5,866,113 | A | 2/1999 | Hendriks | |
| 5,869,127 | A | 2/1999 | Zhong | |
| 5,871,823 | A | 2/1999 | Anders | |
| 5,874,500 | A | 2/1999 | Rhee | |
| 5,879,436 | A | 3/1999 | Kramer | |
| 5,879,697 | A | 3/1999 | Ding | |
| 5,882,687 | A | 3/1999 | Park | |
| 5,885,647 | A | 3/1999 | Larm | |
| 5,894,002 | A | 4/1999 | Boneberger | |
| 5,910,518 | A | 6/1999 | Nakada | |
| 5,922,161 | A | 7/1999 | Wu | |
| 5,922,249 | A | 7/1999 | Ajello | |
| 5,936,052 | A | 8/1999 | Bothe | |
| 5,936,703 | A | 8/1999 | Miyazaki | |
| 5,945,498 | A | 8/1999 | Höpken | |
| 5,962,548 | A | 10/1999 | Vanderlaan | |
| 5,965,631 | A | 10/1999 | Nicolson | |
| 5,981,615 | A | 11/1999 | Meijs | |
| 5,981,675 | A | 11/1999 | Valint, Jr. | |
| 5,995,213 | A | 11/1999 | Davis | |
| 5,997,517 | A | 12/1999 | Whitbourne | |
| 6,007,526 | A | 12/1999 | Passalaqua | |
| 6,011,082 | A | 1/2000 | Wang | |
| 6,013,106 | A | 1/2000 | Tweden | |
| 6,018,001 | A | 1/2000 | Hiratani | |
| 6,020,175 | A | 2/2000 | Onda | |
| 6,036,891 | A * | 3/2000 | Liao | C07D 249/18 252/588 |
| 6,039,913 | A | 3/2000 | Hirt | |
| 6,043,328 | A | 3/2000 | Domschke | |
| 6,048,620 | A | 4/2000 | Zhong | |
| 6,050,980 | A | 4/2000 | Wilson | |
| 6,054,504 | A | 4/2000 | Dalla Riva Toma | |
| 6,063,484 | A | 5/2000 | Exsted | |
| 6,087,415 | A | 7/2000 | Vanderlaan | |
| 6,087,462 | A | 7/2000 | Bowers | |
| 6,090,901 | A | 7/2000 | Bowers | |
| 6,096,138 | A | 8/2000 | Heiler | |
| 6,096,726 | A | 8/2000 | Opolski | |
| 6,099,122 | A | 8/2000 | Chabrecek | |
| 6,099,852 | A | 8/2000 | Jen | |
| 6,106,889 | A | 8/2000 | Beavers | |
| 6,134,342 | A | 10/2000 | Doke | |
| 6,149,842 | A | 11/2000 | Lally | |
| 6,165,322 | A | 12/2000 | Bower | |
| 6,169,127 | B1 | 1/2001 | Lohmann | |
| 6,179,817 | B1 | 1/2001 | Zhong | |
| 6,193,369 | B1 | 2/2001 | Valint, Jr. | |
| 6,197,295 | B1 | 3/2001 | Hsia | |
| 6,207,796 | B1 | 3/2001 | Dairoku | |
| 6,218,508 | B1 | 4/2001 | Kragh | |
| 6,221,061 | B1 | 4/2001 | Englelson | |
| 6,225,431 | B1 | 5/2001 | Bowers | |
| 6,238,799 | B1 | 5/2001 | Opolski | |
| 6,244,707 | B1 * | 6/2001 | Faubl | G02B 1/043 351/159.33 |
| 6,248,127 | B1 | 6/2001 | Shah | |
| 6,284,854 | B1 | 9/2001 | Bowers | |
| 6,297,169 | B1 | 10/2001 | Mangat | |
| 6,301,005 | B1 | 10/2001 | Epstein | |
| 6,303,687 | B1 | 10/2001 | Müller | |
| 6,306,514 | B1 | 10/2001 | Weikel | |
| 6,314,199 | B1 | 11/2001 | Höfer | |
| 6,316,057 | B1 | 11/2001 | Hirayama | |
| 6,323,165 | B1 | 11/2001 | Heiler | |
| 6,340,465 | B1 | 1/2002 | Hsu | |
| 6,340,746 | B1 | 1/2002 | Roberts | |

(56) References Cited

U.S. PATENT DOCUMENTS

| | | |
|---|---|---|
| 6,342,570 B1 | 1/2002 | Bothe |
| 6,346,170 B1 | 2/2002 | Bower |
| 6,348,507 B1 | 2/2002 | Heiler |
| 6,350,777 B2 | 2/2002 | Pinney |
| 6,364,934 B1 | 4/2002 | Nandu |
| 6,367,929 B1 | 4/2002 | Maiden |
| 6,368,643 B1 | 4/2002 | Fan |
| 6,407,083 B1 | 6/2002 | Xu |
| 6,410,616 B1 | 6/2002 | Harada |
| 6,423,744 B2 | 7/2002 | Moran |
| 6,428,839 B1 | 8/2002 | Künzler |
| 6,436,481 B1 | 8/2002 | Chabrecek |
| 6,440,366 B1 | 8/2002 | Salpekar |
| 6,440,464 B1 | 8/2002 | Hsia |
| 6,440,571 B1 | 8/2002 | Valint, Jr. |
| 6,447,920 B1 | 9/2002 | Chabrecek |
| 6,451,871 B1 | 9/2002 | Winterton |
| 6,465,056 B1 | 10/2002 | Chabrecek |
| 6,465,602 B2 | 10/2002 | Schroeder |
| 6,478,423 B1 | 11/2002 | Turner |
| 6,479,227 B1 | 11/2002 | Kubo |
| 6,482,221 B1 | 11/2002 | Hebert |
| 6,482,311 B1 | 11/2002 | Wickham |
| 6,495,653 B1 | 12/2002 | Kinsho |
| 6,500,481 B1 | 12/2002 | Vanderlaan |
| 6,517,678 B1 | 2/2003 | Shannon |
| 6,521,352 B1 | 2/2003 | Chabrecek |
| 6,525,040 B1 | 2/2003 | Erdelmeier |
| 6,531,432 B2 | 3/2003 | Molock |
| 6,534,559 B1 | 3/2003 | Vanderlaan |
| 6,537,614 B1 | 3/2003 | Wei |
| 6,551,267 B1 | 4/2003 | Cohen |
| 6,582,754 B1 | 6/2003 | Pasic |
| 6,586,038 B1 | 7/2003 | Chabrecek |
| 6,586,520 B1 | 7/2003 | Canorro |
| 6,589,665 B2 | 7/2003 | Chabrecek |
| 6,596,294 B2 | 7/2003 | Lai |
| 6,599,559 B1 | 7/2003 | McGee |
| 6,602,930 B2 | 8/2003 | Imafuku |
| 6,614,516 B2 | 9/2003 | Epstein |
| 6,623,747 B1 | 9/2003 | Chatelier |
| 6,623,786 B2 | 9/2003 | Baron |
| 6,627,124 B1 | 9/2003 | Herbrechtsmeier |
| 6,630,243 B2 | 10/2003 | Valint, Jr. |
| 6,638,563 B2 | 10/2003 | McGee |
| 6,673,447 B2 | 1/2004 | Wei |
| 6,683,062 B2 | 1/2004 | Opolski |
| 6,686,054 B2 | 2/2004 | Nigam |
| 6,689,480 B2 | 2/2004 | Shimoyama |
| 6,699,435 B2 | 3/2004 | Salpekar |
| 6,719,929 B2 | 4/2004 | Winterton |
| 6,730,366 B2 | 5/2004 | Lohmann |
| 6,733,123 B2 | 5/2004 | Polzhofer |
| 6,734,321 B2 | 5/2004 | Chabrecek |
| 6,740,336 B2 | 5/2004 | Trubetskoy |
| 6,743,878 B2 | 6/2004 | Bowers |
| 6,762,264 B2 | 7/2004 | Künzler |
| 6,793,973 B2 | 9/2004 | Winterton |
| 6,794,456 B2 | 9/2004 | Grobe, III |
| 6,800,225 B1 | 10/2004 | Hagmann |
| 6,811,805 B2 | 11/2004 | Gilliard |
| 6,822,016 B2 | 11/2004 | McCabe |
| 6,835,410 B2 | 12/2004 | Chabrecek |
| 6,838,491 B1 | 1/2005 | Vanderlaan |
| 6,858,310 B2 | 2/2005 | McGee |
| 6,866,936 B2 | 3/2005 | Opolski |
| 6,866,938 B2 | 3/2005 | Mori |
| 6,867,245 B2 | 3/2005 | Iwata |
| 6,878,399 B2 | 4/2005 | Chabrecek |
| 6,884,457 B2 | 4/2005 | Gilliard |
| 6,891,010 B2 | 5/2005 | Kunzler |
| 6,896,926 B2 | 5/2005 | Qiu |
| 6,902,812 B2 | 6/2005 | Valint, Jr. |
| 6,921,802 B1 | 7/2005 | Künzler |
| 6,923,538 B2 | 8/2005 | Dean |
| 6,923,978 B2 | 8/2005 | Chatelier |
| 6,926,965 B2 | 8/2005 | Qiu |
| 6,936,641 B2 | 8/2005 | Molock |
| 6,940,580 B2 | 9/2005 | Winterton |
| 6,951,894 B1 | 10/2005 | Nicolson |
| 7,018,688 B2 | 3/2006 | Shepherd |
| 7,032,251 B2 | 4/2006 | Janssen |
| 7,052,131 B2 | 5/2006 | McCabe |
| 7,091,283 B2 | 8/2006 | Müller |
| 7,160,953 B2 | 1/2007 | Bowers |
| 7,238,750 B2 | 7/2007 | Müller |
| 7,247,692 B2 | 7/2007 | Laredo |
| 7,249,848 B2 | 7/2007 | Laredo |
| 7,268,189 B2 | 9/2007 | Müller |
| 7,268,198 B2 | 9/2007 | Kunzler |
| 7,270,678 B2 | 9/2007 | Valint, Jr. |
| 7,297,725 B2 | 11/2007 | Winterton |
| 7,344,607 B2 | 3/2008 | Melzer |
| 7,360,890 B2 | 4/2008 | Back |
| 7,364,723 B1 | 4/2008 | Nakada |
| 7,384,590 B2 | 6/2008 | Kelly |
| 7,387,759 B2 | 6/2008 | Kelly |
| 7,396,890 B2 | 7/2008 | Zanini |
| 7,399,795 B2 | 7/2008 | Lai |
| 7,423,074 B2 | 9/2008 | Lai |
| 7,426,993 B2 | 9/2008 | Coldrey |
| 7,428,029 B2 | 9/2008 | Murakami |
| 7,429,558 B2 | 9/2008 | Batchelor |
| 7,429,623 B2 | 9/2008 | Molock |
| 7,435,452 B2 | 10/2008 | Shimoyama |
| 7,452,377 B2 | 11/2008 | Watling |
| 7,468,398 B2 | 12/2008 | Nicolson |
| 7,521,519 B1 | 4/2009 | Hirt |
| 7,538,146 B2 | 5/2009 | Nicolson |
| 7,540,609 B2 | 6/2009 | Chen |
| 7,553,880 B2 | 6/2009 | Nicolson |
| 7,556,858 B2 | 7/2009 | Rasmussen |
| 7,572,841 B2 | 8/2009 | Chen |
| 7,588,334 B2 | 9/2009 | Matsushita |
| 7,632,876 B2 | 12/2009 | Lai |
| 7,671,156 B2 | 3/2010 | Phelan |
| 7,691,917 B2 | 4/2010 | Lai |
| 7,726,809 B2 | 6/2010 | Filippo |
| 7,780,879 B2 | 8/2010 | Pruitt |
| 7,781,536 B2 | 8/2010 | Kamiya |
| 7,781,554 B2 | 8/2010 | Lai |
| 7,789,509 B2 | 9/2010 | Mentak |
| 7,832,856 B2 | 11/2010 | Vanderbilt |
| 7,841,716 B2 | 11/2010 | McCabe |
| 7,847,025 B2 | 12/2010 | Liu |
| 7,857,447 B2 | 12/2010 | Myung |
| 7,875,687 B2 | 1/2011 | Kunzler |
| 7,879,267 B2 | 2/2011 | Turner |
| 7,919,136 B2 | 4/2011 | Linhardt |
| 8,092,724 B2 | 1/2012 | Pruitt |
| 8,163,206 B2 | 4/2012 | Chang |
| 8,440,735 B2 | 5/2013 | Pruitt |
| 8,480,227 B2 | 7/2013 | Qiu |
| 8,529,057 B2 | 9/2013 | Qiu |
| 8,689,971 B2 | 4/2014 | Minick |
| 2001/0019762 A1 | 9/2001 | Nazarova |
| 2001/0025198 A1 | 9/2001 | Faubl |
| 2001/0031744 A1 | 10/2001 | Kosbab |
| 2001/0045676 A1 | 11/2001 | Winterton |
| 2001/0048975 A1 | 12/2001 | Winterton |
| 2002/0006493 A1 | 1/2002 | Chabrecek |
| 2002/0086160 A1 | 7/2002 | Qiu |
| 2002/0120084 A1 | 8/2002 | Valint, Jr. |
| 2002/0128161 A1 | 9/2002 | Wickham |
| 2002/0149742 A1 | 10/2002 | Back |
| 2002/0165215 A1 | 11/2002 | Lam |
| 2002/0182315 A1 | 12/2002 | Heiler |
| 2002/0182316 A1 | 12/2002 | Gilliard |
| 2002/0190759 A1 | 12/2002 | Tour |
| 2002/0197304 A1 | 12/2002 | Schrauzer |
| 2003/0008154 A1 | 1/2003 | Aguado |
| 2003/0012872 A1 | 1/2003 | Qiu |
| 2003/0039742 A1 | 2/2003 | Qiu |
| 2003/0039748 A1 | 2/2003 | Valint, Jr. |

(56) References Cited

U.S. PATENT DOCUMENTS

| | | |
|---|---|---|
| 2003/0052424 A1 | 3/2003 | Turner |
| 2003/0083383 A1 | 5/2003 | Spallholz |
| 2003/0117579 A1 | 6/2003 | Morris |
| 2003/0125498 A1 | 7/2003 | McCabe |
| 2003/0134132 A1 | 7/2003 | Winterton |
| 2003/0143335 A1 | 7/2003 | Qiu |
| 2003/0162862 A1 | 8/2003 | McCabe |
| 2003/0175325 A1 | 9/2003 | Chatelier |
| 2003/0186825 A1 | 10/2003 | Mitani |
| 2004/0009361 A1* | 1/2004 | Street ............. B32B 27/36 428/482 |
| 2004/0018295 A1 | 1/2004 | Qiu |
| 2004/0047979 A1 | 3/2004 | Qiu |
| 2004/0067365 A1 | 4/2004 | Qiu |
| 2004/0108607 A1 | 6/2004 | Winterton |
| 2004/0116564 A1 | 6/2004 | Devlin |
| 2004/0170752 A1 | 9/2004 | Luthra |
| 2005/0060812 A1 | 3/2005 | Batchelor |
| 2005/0228065 A1 | 10/2005 | Nicolson |
| 2005/0237480 A1* | 10/2005 | Allbritton ............ G02B 1/043 351/159.01 |
| 2006/0063852 A1 | 3/2006 | Iwata |
| 2006/0100113 A1 | 5/2006 | Pegram |
| 2006/0142410 A1 | 6/2006 | Baba |
| 2006/0217276 A1 | 9/2006 | Mitani |
| 2007/0037898 A1 | 2/2007 | Phelan |
| 2007/0066706 A1 | 3/2007 | Manesis |
| 2007/0092831 A1* | 4/2007 | Lai .............. C08F 220/26 430/270.1 |
| 2007/0105973 A1 | 5/2007 | Nicolson |
| 2007/0105974 A1 | 5/2007 | Nicolson |
| 2007/0122540 A1* | 5/2007 | Salamone ............ A61L 27/10 427/2.24 |
| 2007/0149428 A1 | 6/2007 | Ammon, Jr. |
| 2007/0185281 A1 | 8/2007 | Song |
| 2007/0229758 A1 | 10/2007 | Matsuzawa |
| 2007/0255014 A1 | 11/2007 | Salamone |
| 2007/0296914 A1 | 12/2007 | Hong |
| 2008/0003259 A1 | 1/2008 | Salamone |
| 2008/0015315 A1 | 1/2008 | Chang |
| 2008/0017525 A1 | 1/2008 | Newman |
| 2008/0100796 A1 | 5/2008 | Pruitt |
| 2008/0110770 A1 | 5/2008 | Burke |
| 2008/0138310 A1 | 6/2008 | Ketelson |
| 2008/0142038 A1 | 6/2008 | Kunzler |
| 2008/0143003 A1 | 6/2008 | Phelan |
| 2008/0143957 A1 | 6/2008 | Linhardt |
| 2008/0143958 A1 | 6/2008 | Medina |
| 2008/0148689 A1 | 6/2008 | Xia |
| 2008/0152540 A1 | 6/2008 | Schorzman |
| 2008/0152800 A1 | 6/2008 | Bothe |
| 2008/0170201 A1 | 7/2008 | Filippo |
| 2008/0174035 A1 | 7/2008 | Winterton |
| 2008/0226922 A1 | 9/2008 | Ferreiro |
| 2008/0231798 A1 | 9/2008 | Zhou |
| 2008/0234457 A1 | 9/2008 | Zhou |
| 2008/0273168 A1 | 11/2008 | Rathore |
| 2008/0275156 A1 | 11/2008 | Laredo |
| 2008/0306455 A1 | 12/2008 | Dias |
| 2008/0307751 A1 | 12/2008 | Newman |
| 2008/0314767 A1 | 12/2008 | Lai |
| 2009/0036577 A1 | 2/2009 | Luo |
| 2009/0039535 A1 | 2/2009 | Nicolson |
| 2009/0046242 A1 | 2/2009 | Nicolson |
| 2009/0057164 A1 | 3/2009 | Minick |
| 2009/0100801 A1 | 4/2009 | Zhao |
| 2009/0111942 A1 | 4/2009 | Lang |
| 2009/0141234 A1 | 6/2009 | Blackwell |
| 2009/0142485 A1* | 6/2009 | Lai ................ A61L 27/18 427/162 |
| 2009/0142508 A1 | 6/2009 | Lai |
| 2009/0145086 A1 | 6/2009 | Reynolds |
| 2009/0145091 A1 | 6/2009 | Connolly |
| 2009/0160074 A1 | 6/2009 | Pruitt |
| 2009/0168012 A1 | 7/2009 | Linhardt |
| 2009/0169716 A1 | 7/2009 | Linhardt |
| 2009/0171027 A1 | 7/2009 | Linhardt |
| 2009/0171049 A1 | 7/2009 | Linhardt |
| 2009/0171050 A1 | 7/2009 | Linhardt |
| 2009/0171459 A1 | 7/2009 | Linhardt |
| 2009/0173044 A1 | 7/2009 | Linhardt |
| 2009/0173045 A1 | 7/2009 | Lai |
| 2009/0173643 A1 | 7/2009 | Lai |
| 2009/0182067 A1 | 7/2009 | Liu |
| 2009/0186229 A1 | 7/2009 | Muller |
| 2009/0238948 A1 | 9/2009 | Muller |
| 2009/0264553 A1 | 10/2009 | Chen |
| 2009/0280157 A1 | 11/2009 | Maas |
| 2010/0029802 A1 | 2/2010 | Mehrabi |
| 2010/0041787 A1 | 2/2010 | Chen |
| 2010/0048847 A1 | 2/2010 | Broad |
| 2010/0084775 A1 | 4/2010 | McCabe |
| 2010/0118261 A1 | 5/2010 | McGee |
| 2010/0127219 A1 | 5/2010 | Mohamed |
| 2010/0149482 A1 | 6/2010 | Ammon, Jr. |
| 2010/0152084 A1 | 6/2010 | Rathore |
| 2010/0162661 A1 | 7/2010 | Vanderbilt |
| 2010/0162663 A1 | 7/2010 | McGee |
| 2010/0225881 A1 | 9/2010 | Filippo |
| 2010/0238398 A1 | 9/2010 | Nicolson |
| 2010/0240776 A1 | 9/2010 | Filippo |
| 2010/0249356 A1 | 9/2010 | Rathore |
| 2010/0258961 A1 | 10/2010 | Chang |
| 2010/0276823 A1 | 11/2010 | Pruitt |
| 2010/0276824 A1 | 11/2010 | Pruitt |
| 2010/0296049 A1 | 11/2010 | Justynska |
| 2010/0298446 A1 | 11/2010 | Chang |
| 2010/0300902 A1 | 12/2010 | Marmo |
| 2011/0009519 A1 | 1/2011 | Awasthi |
| 2011/0009587 A1 | 1/2011 | Awasthi |
| 2011/0015298 A1 | 1/2011 | Schorzman |
| 2011/0102736 A1 | 5/2011 | Wu |
| 2011/0134387 A1 | 6/2011 | Samuel |
| 2012/0029111 A1 | 2/2012 | Chang |
| 2012/0147323 A1 | 6/2012 | Domschke |
| 2012/0172478 A1 | 7/2012 | Chang |
| 2014/0237945 A1 | 8/2014 | Minick |

FOREIGN PATENT DOCUMENTS

| | | |
|---|---|---|
| EP | 0138385 A2 | 4/1985 |
| EP | 0321403 A2 | 6/1989 |
| EP | 0362137 A2 | 4/1990 |
| EP | 0362145 A2 | 4/1990 |
| EP | 0393532 A2 | 10/1990 |
| EP | 0455323 A2 | 11/1991 |
| EP | 0480809 A2 | 4/1992 |
| EP | 0537972 A1 | 4/1993 |
| EP | 0574352 A1 | 12/1993 |
| EP | 0643083 A1 | 3/1995 |
| EP | 0713106 A1 | 5/1996 |
| EP | 0728487 A1 | 8/1996 |
| EP | 0747071 A1 | 12/1996 |
| EP | 0751407 A2 | 1/1997 |
| EP | 0758687 A1 | 2/1997 |
| EP | 0780419 A1 | 6/1997 |
| EP | 0850924 A1 | 7/1998 |
| EP | 0894504 A2 | 2/1999 |
| EP | 0940447 A2 | 9/1999 |
| EP | 0940693 A2 | 9/1999 |
| EP | 0963761 A1 | 12/1999 |
| EP | 0800511 B1 | 1/2000 |
| EP | 0989418 A2 | 3/2000 |
| EP | 0995762 A2 | 4/2000 |
| EP | 1138385 A1 | 10/2001 |
| EP | 1140724 A1 | 10/2001 |
| EP | 1153964 A2 | 11/2001 |
| EP | 0613381 B1 | 2/2002 |
| EP | 1272353 B1 | 12/2003 |
| EP | 1299753 B1 | 5/2004 |
| EP | 1287060 B1 | 11/2005 |
| EP | 1214383 B1 | 12/2005 |
| EP | 1149198 B1 | 4/2006 |

(56) References Cited

FOREIGN PATENT DOCUMENTS

| | | | |
|---|---|---|---|
| EP | 1179190 B1 | 4/2006 | |
| EP | 1666924 A2 | 6/2006 | |
| EP | 0865326 B1 | 8/2006 | |
| EP | 1569702 B1 | 10/2006 | |
| EP | 1754731 A1 | 2/2007 | |
| EP | 1465931 B1 | 8/2007 | |
| EP | 1802357 B1 | 12/2009 | |
| EP | 1945688 B1 | 12/2010 | |
| EP | 1861069 B2 | 7/2013 | |
| EP | 1802357 B2 | 9/2013 | |
| GB | 2012070 A | 7/1979 | |
| JP | 61209275 A | 9/1986 | |
| JP | 08239639 A | 9/1996 | |
| JP | 2000056273 A | 2/2000 | |
| JP | 2005206720 | 8/2005 | |
| WO | 8909246 A1 | 10/1989 | |
| WO | 9104283 A1 | 4/1991 | |
| WO | 9209639 A2 | 6/1992 | |
| WO | 9209650 A1 | 6/1992 | |
| WO | 9300391 A1 | 1/1993 | |
| WO | 9406485 A1 | 3/1994 | |
| WO | 9500618 A1 | 1/1995 | |
| WO | 9502251 A2 | 1/1995 | |
| WO | 9504609 A1 | 2/1995 | |
| WO | 9520407 A1 | 8/1995 | |
| WO | 9618498 A1 | 6/1996 | |
| WO | 9620796 A1 | 7/1996 | |
| WO | 9624392 A1 | 8/1996 | |
| WO | 9631792 A1 | 10/1996 | |
| WO | 9637241 A1 | 11/1996 | |
| WO | 9700274 A1 | 1/1997 | |
| WO | 9718904 A1 | 5/1997 | |
| WO | 9721497 A1 | 6/1997 | |
| WO | 9723532 A1 | 7/1997 | |
| WO | 9729160 A1 | 8/1997 | |
| WO | 9805269 A1 | 2/1998 | |
| WO | 9821270 A1 | 5/1998 | |
| WO | 9828026 A1 | 7/1998 | |
| WO | 9833089 A1 | 7/1998 | |
| WO | 9915917 A1 | 4/1999 | |
| WO | 9935520 A1 | 7/1999 | |
| WO | 9957581 A1 | 11/1999 | |
| WO | 0072052 A1 | 11/2000 | |
| WO | 0105745 A1 | 1/2001 | |
| WO | 0116626 A1 | 3/2001 | |
| WO | 0126668 A1 | 4/2001 | |
| WO | 0157118 A2 | 8/2001 | |
| WO | 0192924 A1 | 12/2001 | |
| WO | 0216974 A2 | 2/2002 | |
| WO | 02071106 A1 | 9/2002 | |
| WO | 02097481 A1 | 12/2002 | |
| WO | 03037960 A1 | 5/2003 | |
| WO | 03042724 A1 | 5/2003 | |
| WO | 03066714 A1 | 8/2003 | |
| WO | 2004050132 A2 | 6/2004 | |
| WO | 2005031400 A2 | 4/2005 | |
| WO | 2006088758 A2 | 8/2006 | |
| WO | 2008073193 A2 | 6/2008 | |
| WO | 2008074838 A1 | 6/2008 | |
| WO | 2008076506 A1 | 6/2008 | |
| WO | 2008095955 A1 | 8/2008 | |
| WO | 2009009639 A2 | 1/2009 | |
| WO | 2009085902 A1 | 7/2009 | |
| WO | 2010065355 A1 | 6/2010 | |
| WO | 2010071691 A1 | 6/2010 | |

OTHER PUBLICATIONS

"Intermediate Step and Krebs' Cycle"—http://www.physiologymodels.info/metabolism/KREBS/krebs.htm, accessed online Mar. 3, 2017.*

Authors: Motoko Uchida, Toyoki Kunitake and Tisato Kajiyama Title: Blood compatibility-surface characteristic relationships of a Langmuir-Blodgett film composed of an anionic amphiphile-polycation complex Published: New Polymeric Mater. 1994, vol. 4, No. 3, pp. 199-211.

Authors: T.G. Vargo, J.M. Calvert, K.J. Wynne, J.K. Avlyanov, A.G. MacDiarmid and M.F. Rubner Title: Patterned polymer multilayer fabrication by controlled adhesion of polyelectrolytes to plasma-modified fluorpolymer surfaces Published: Supramolecular Science (1995) vol. 2, No. 3-4, pp. 169-174.

Authors: Dongsik Yoo, Jin-Kyu Lee, and M.F. Rubner Title: Investigations of New Self-Assembled Multilayer Thin Films Based on Alternately Adsorbed Layers of Polyelectrolytes and Functional Dye Molecules Published: Mat. Res. Soc. Symp. Proc. vol. 413 (1996) Materials Research Society pp. 395-400.

Authors: Dongsik Yoo and Michael F. Rubner Title: Layer-by-Layer Modification of Surfaces Through the Use of Self-Assembled Monolayers of Polyions Published: Antec 1995, pp. 2568-2570.

Authors: Dongsik Yoo, Aiping Wu, Jinkyu Lee and Michael F. Rubner Title: New Electro-Active Self-Assembled Multilayer Thin Films Based on Alternately Adsorbed Layers of Polyelectrolytes and functional dye Molecules Published: Synthetic Metals 85 (1997) pp. 1425-1426.

Authors: Lynn C. Winterton, Jack C. White and Kai C. Su Title: Coulometric Method for Measuring Oxygen Flux and Dk of Contact Lenses and Lens Materials Published: The Cornea: Transactions of the World Congress on the Cornea III, Raven Press, 1988, pp. 273-280.

PCT International Search Report dated Apr. 1, 2014, International Application No. PCT/EP2013/076658, International Filing Date Dec. 16, 2013.

PCT Written Opinion of the International Searching Authority dated Apr. 1, 2014, International Application No. PCT/EP2013/076658, International Filing Date Dec. 16, 2013.

Machine Translation of JP2005-206720.

Authors: Joël Baguet, Françoise Sommer, Véronique Claudon-Eyl and Tran Minh Duc Name of Article: Characterization of lacrymal component accumulation on worn soft contact lens surfaces by atomic force microscopy Published: Biomaterials 16 (1995) pp. 3-9.

Authors: Joël Baguet, Françoise Sommer, Tran Minh Duc Name of Article: Imaging surfaces of hydrophilic contact lenses with the atomic force microscope Published: Biomaterials 1993, vol. 14, No. 4, pp. 279-284.

Authors: Z M Jin and D. Dowson Article: Elastohydrodynamic lubrication in biological systems Published: Proc. IMechE (2005) vol. 219, Part J: J. Engineering Tribology pp. 367-380.

Authors: Jeannine E. Elliott, Mara MacDonald, Jun Nie, Christopher N. Bowman Article: Structure and swelling of poly(acrylic acid) hydrogels: effect of pH, ionic strength, and dilution on the crosslinked polymer structure Published: Polymer 45 (2004) pp. 1503-1510.

Authors: Niriam V. Flores-Merino, Somot Chirasatitsin, Caterina Lopresti, Gwendolen C. Reilly, Giuseppe Battaglia and Adam J. Engler Article: Nanoscopic mechanical anisotropy in hydrogel surfaces Published: The Royal Society of Chemistry 2010.

Authors: F. Formasiero, J.M. Prausnitz, C.J. Radke Article: Post-lens tear-film depletion due to evaporative dehydration of a soft contact lens Published: Journal of Membrane Science 275 (2006) pp. 229-243.

Authors: Francesco Fornasiero, Florian Krull, John M. Prausnitz, Clayton J. Radke Article: Steady-state diffusion of water through soft-contact-lens materials Published: Biomaterials 26 (2005) pp. 5704-5716.

Authors: Jian Ping Gong, Takayuki Kurokawa, Tetsuharu Narita, Go Kagata, Yoshihito Osada, Goro Nishimura and Masataka Kinjo Article: Synthesis of Hydrogels with Extremely Low Surface Friction Published: J. Am. Chem. Soc. 2001, 123 pp. 5582-5583.

Authors: J.M. González-Méijome , J.B. Almeida and M.A. Parafita Article: Analysis of surface Mechanical Properties of Unworn and Worn Silicone Hydrogel Contact Lenses Using Nanoindentation with AFM Published: Microscopy: Science, Technology, Applications and Education, (Formatex 2010) pp. 554-559.

Authors: George L. Grobe III, Paul L. Valint, Jr. and Daniel M. Ammon, Jr. Article: Surface chemical structure for soft contact lenses as a function of polymer processing Published: Journal of Biomedical Materials Research, vol. 32 pp. 45-54, 1996.

(56) References Cited

OTHER PUBLICATIONS

Authors: Murat Guvendiren, Jason A. Burdick, and Shu Yang Article: Kinetic study of swelling-induced surface pattern formation and ordering in hydrogel films with depth-wise crosslinking gradient Published: Soft matter, 2010, vol. 6, pp. 2044-2049.

Authors: Gavin Hoch, Anuj Chauhan, C. J. Radke Article: Permeability and diffusivity for water transport through hydrogel membranes Published: Journal of Membrane Science 214 (2003) 199-209.

Authors: R.E. Imhof, H.J.S. Birch, F.R. Thornley and J.R. Gilchrist Article: Opto-thermal Transient Emission Radiometry: a New Surface Analysis Technique Published: Analytical Proceedings, Jan. 1987, vol. 24, pp. 17-18.

Authors: L. Jones, C. May, L. Nazar, T. Simpson Article: In vitro evaluation of the dehydration characteristics of silicone hydrogel and conventional hydrogel contact lens materials Published: Contact Lens &Anterior Eye 25 (2002) pp. 147-156.

Authors: Lyndon Jones, Lakshman Subbaraman, Ronan Rogers, and Kathy Dumbleton Article: Surface treatment, wetting and modulus of silicone hydrogels Published: Contact Lens Monthly, Optician, Sep. 1, 2006, No. 6067, vol. 232, pp. 28-34.

Authors: Seong Han Kim, Aric Opdahl, Chris Marmo, Gabor A. Somorjai Article: AFM and SFG studies of pHEMA-based hydrogel contact lens surfaces in saline solution: adhesion, friction, and the presence of non-crosslinked polymer chains at the surface Published: Biomaterials 23 (2002) pp. 1657-1666.

Authors: Seong Han Kim, Chris Marmo, Gabor A. Somorjia Article: Friction studies of hydrogel contact lenses using AFM: non-crosslinked polymers of low friction at the surface Published: Biomaterials 22 (2001) pp. 3285-3294.

Authors: Gerald E. Lowther Article: Hydrophilic Lens Inspection with Phase Contrast Microscopy Published: American Journal of Optometry & Physiological Optics, vol. 58, No. 8, pp. 621-625, Aug. 1981.

Authors: M.D. Merindano, M. Canals, C. Saona and J. Costa Article: Rigid gas permeable contact lenses surface roughness examined by interferential shifting phase and scanning electron microscopies Published: Ophthal. Physiol. Opt. vol. 18, No. 1, pp. 75-92, 1998.

Authors: K.J. Stout, L. Blunt Article: Nanometres to micrometres: three-dimensional surface measurement in bio-engineering Published: Surface and Coatings Technology 71 (1995) pp. 69-81.

Authors: Oğuz Okay, Safiye B. Sariisik Article: Swelling behavior of poly(acrylamide-co-sodium acrylate) hydrogels in aqueous salt solutions: theory versus experiments Published: European Polymer Journal 36 (2000) pp. 393-399.

Authors: Sudi Patel, Waheeda Illahi, Arthur Davis Article: Changes in water content of high plus hydrogel lenses worn on an extended wear basis in a geriatric aphakic population Published: Contact Lens & Anterior Eye 28 (2005) pp. 127-134.

Authors: Carol E. Rabke, Paul L. Valint, Jr., and Daniel M. Ammon Article: Ophthalmic Applications of Atomic Force Microscopy Published: ICLC, vol. 22 Jan./Feb., 1995, pp. 32-41.

Authors: V. Rebeix, F. Sommer, B. Marchin, D. Baude, Tran Minh Duc Article Artificial tear adsorption on soft contact lenses: methods to test surfactant efficacy Published: Biomaterials, 21 (2000), pp. 1197-1205.

Authors: Ronan Rogers Article: In vitro and ex vivo wettability of hydrogel contact lenses Published: Thesis, University of Waterloo, Waterloo, Ontario, Canada, 2006.

Authors: F.M. Serry Article: Applications of Atomic Force Microscopy for Contact Lens Manufacturing Published: Veeco Instruments, Inc., (2004) www.veeco.com.

Authors: Christopher Snyder, OD, MS, FAAO Article: A Primer on Contact Lens Materials Published: http://www.clspectrum.com/references.asp, (2004) Contact Lens Spectrum, Document 102.

Authors: Kim Sweers, Kees Van Der Werf, Martin Bennink and Vinod Subramaniam Article: Nanomechanical properties of a-synuclein amyloid fibrils: a comparative study by nanoindentation, harmonic force microscopy, and Peakforce QNM Published: Nanoscale Research Letters, 2011, 6:270, pp. 1-10.

Authors: Gareth Ross, Muriel Nasso, Val Franklin, Fiona Lydon and Brian Tighe Article: Silicone Hydrogels: Trends in Products and Properties Published: Biomaterials Research Unit, Aston University, Birmingham B4 7ET (2005).

Authors: David A . Tirrell, Doreen Y. Takigawa and Kenji Seki Article: pH Sensitization of Phospholipid Vesicles via Complexation with Synthetic Poly(carboxylic acid)s Published: Annals of the New York Academy of Sciences, (1985), pp. 237-248.

Authors: Ioannis Tranoudis, Nathan Efron Article: Water properties of soft contact lens materials Published: Contact Lens & Anterior Eye 27 (2004) pp. 193-208.

Authors: Sean L. Willis, Jane L. Court, Richard P. Redman, Hin-Hai Wang, Simon W. Leppard, Wincent J. O'Byrne, Sharon A. Small, Andrew L. Lewis, Stephen A. Jones, Peter W. Stratford Article: A novel phosphorylcholine-coated contact lens for extended wear use Published: Biomaterials 22 (2001) pp. 3261-3272.

Authors: Peng Xiao, Robert E. Imhof Article: Opto-Thermal Skin Water Concentration Gradient, Measurement Published: School of EE & IE, South Bank University, (1996) vol. 2681, p. 31-41.

Authors: Sang-Kyu Kam, John Gregory Title: Charge determination of synthetic cationic polyelectrolytes by colloid titration Published: Colloids and Surfaces, A Physicochemical and Engineering Aspects 159 (1999) 165-179.

Authors: Niklaus Bühler, Hans-Peter Haerri, Manfred Hofmann, Christine Irrgang, Andreas Mühlebach, Beat Müller, and Friedrich Stockinger Title: Nelfilcon A, a New Material for Contact Lenses Published: Chimia 53 (1999) 269-274 Industrial Chemistry.

Authors: N. Dilsiz and G. Akovali Title: Plasma Polymerization of Selected Organic Compounds Published: Polymer, (1996) vol. 37, No. 2, pp. 333-342.

Author: Frank Jansen, Ph.D. Title: Plasma Deposited Thin Films (Chapter 1) Published in: Plasma Deposition Processes (19), CRC Press (1986), Boca Raton, FL, Editors: F. Jansen and J. Mort, Ph.D.

Author: H. Yasuda Title: Glow Discharge Polymerization Published: Journal of Polymer Science: Macromolecular Reviews, vol. 16 (1981), pp. 199-293.

Author: D. M. Mattox Title: The Application of Plasmas to Thin Film Deposition Processes Published: Plasma-Surface Interactions and Processing of Materials, Kluwer Academic Publishers in NATO ASI Series; Series E: Applied Scieces, vol. 176 (1990), pp. 377-399 Editors: O. Auciello, Alberto Gras-Martí, Jose Antonio Valles-Abarca, Daniel L. Flamm.

Authors: Kazuo Sugiyama and Koji Ohga Title of Article: Surface modified poly(methyl methacrylate) with 1-methyl-2-methacrylamidoethyl phosphorylcholine moiety Published: Macromol. Chem. Phys 200, No. 6 (1999) pp. 1439-1445.

Authors: Sean P. Cullen, Ian C. Mandel, and Padma Gopalan Title of article: Surace-Anchored Poly(2-vinyl-4,4-dimethyl azlactone) Brushes as Templates for Enzyme Immobilization Published: Langmuir, 2008 24 (23) pp. 13701-13709.

Authors: J. H. Cheung, A. F. Fou, M. Ferreira and M. F. Rubner Title of Article: Molecular Self-Assembly of Conducting Polymers: A New Layer-by-Layer Thin Film Deposition Process Published: Department of Materials Science and Engineering, Massachusetts Institute of Technology, Cambridge, MA 02139 pp. 757-758.

Authors: J.H. Cheung, W.B. Stockton, and M.F. Rubner Title of Article: Molecular-Level Processing of Conjugated Polymers. 3. Layer-by-Layer Manipulation of Polyaniline via Electrostatic Interactions Published: Macromolecules 1997 vol. 30, pp. 2712-2716.

Authors: John C. Crawford Title of Article: 2(2-Hydroxyphenyl)2H-benzotriazole ultraviolet stabilizers Published: Progress in Polymer Science, 1999, vol. 24 pp. 7-43.

Authors: Gero Decher, Birgit Lehr, Klaus Lowack, Yuri Lvov & Johannes Schmitt Title of Article: New nanocomposite films for biosensors: layer-by-layer adsorbed films of polyelectrolytes, proteins or DNA Published: Biosensors & Bilelectronics 1994, vol. 9, pp. 677-684.

Authors: M. Ferreiera and M.F. Rubner Title of Article: Molecular-Level Processing of Conjugated Polymers. 1. Layer-by-Layer Manipu-

(56) References Cited

OTHER PUBLICATIONS lation of Conjugated Polyions Published: American Chemical Society (Macromolecules) 1995, vol. 28, No. 21, pp. 7107-7114.
Authors: A.C. Fou and M.F. Rubner Title of Article: Molecular-Leval Processing of Conjugated Polymers. 2. Layer-by-Layer Manipulation of In-Situ Polymerized p-Type Doped Conducting Polymers Published: Macromolecules 1995, vol. 28, No. 21, pp. 7115-7120.
Authors: H. Kaczmarek, A Szalla, A. Kamińska Title of Article: Study of poly(acrylic acid)-poly(vinylpyrrolidone) complexes and their photostability Published: Polymer 42 (2001) pp. 6057-6069.
Authors: O. Onitsuka, A.C. Fou, M. Ferreira, B.R. Hsieh, and M.F. Rubner Title of Article: Enhancement of light emitting diodes bases on self-assembled heterostructures of poly(p-phenylene vinylene) Published: J. Appl. Phys. 80 (7), Oct. 1, 1996 pp. 4067-4071.
Authors: G.B. Sukhorukov, H, Möhwald, G. Decher, Y.M. Lvov Title of Article: Assembly of polyelectrolyte multilayer films by consecutively alternating adsorption of polynucleotides and polycations Published: Thin Solid Films 284-285 (1996) 220-223.

* cited by examiner

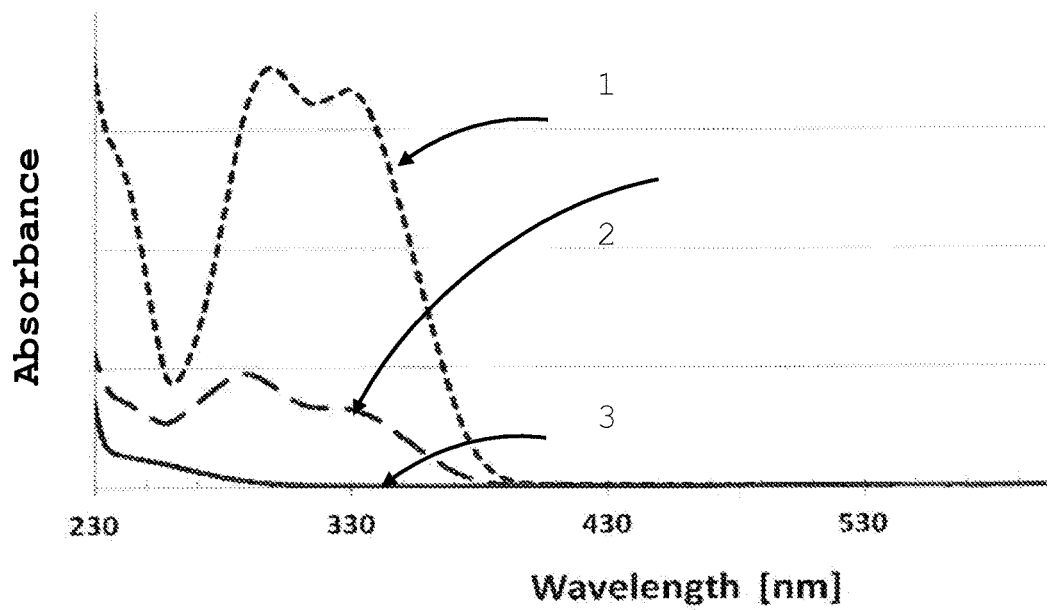

METHOD FOR MAKING IMPROVED UV-ABSORBING OPHTHALMIC LENSES

This application claims the benefit under 35 USC § 119 (e) of U.S. provisional application No. 61/738,014 filed Dec. 17, 2012, herein incorporated by reference in its entirety.

This invention is related to a method for making ophthalmic lenses (including contact lenses and intraocular lenses) capable of blocking ultra-violet ("UV") radiation and thereby protecting eyes to some extent from damages caused by UV radiation. This invention also provides UV-absorbing ophthalmic lenses made according to a method of the invention.

BACKGROUND

UV-absorbing ophthalmic lenses, in particular UV-absorbing contact lenses are typically produced in mass by a so-called cast-molding process, which involves thermo- or UV-induced free-radical polymerization of a lens-forming composition including a polymerizable UV-absorber and at least one vinylic monomer, macromer and or prepolymer in molds. Copolymerizable benzotriazole, benzophenone and triazine UV absorbers, which include an ethylenically unsaturated group covalently linked to their UV-absorbing moieties, are known and have been used previously. Those UV-absorbers can be incorporated into the polymer matrix of ophthalmic lenses. However, unpolymerized UV-absorber must be removed through extraction process to ensure obtained ophthalmic lenses to have required biocompatibility for use. In addition, when the lens production is relied on UV-induced polymerization process, which has a processing cycle shorter than that of the thermo-induced polymerization process, there are several disadvantages associated with use of a known polymerizable UV-absorber. First, the efficiency of incorporation of the UV-absorber in lenses may not be certain. Second, a UV-absorber present in a lens forming composition can reduce the amount of UV radiation available to initiate polymerization and may even lower the efficiency of covalent incorporation of the UV absorber into resultant lenses. Unreacted UV absorbers generally must be removed from the lenses in one or more extraction processes. Third, a UV-absorber may result in ineffective or uneven photo-polymerization of the lens forming composition.

Therefore, there still exists a need for a cost-effective method for making UV-absorbing contact lenses.

SUMMARY

In one aspect, the invention provides a method for making UV-absorbing ophthalmic lenses, the method comprising the steps of: obtaining an ophthalmic lens, preferably a contact lens; dipping the ophthalmic lens in a coating solution comprising an organic solvent and a UV-absorbing polymer for a period of time sufficient to form a UV-absorbing coating on the ophthalmic lens; wherein the UV-absorbing polymer comprises UV-absorbing monomeric units, covalently bound radical-initiating moieties, and at least about 50%, preferably at least about 60%, more preferably at least about 70%, even more preferably at least about 80%, most preferably at least about 90%, by mole of carboxyl-containing monomeric units; and irradiating the ophthalmic lens after the dipping step to obtain a photo-induced grafting of the UV-absorbing polymer to the ophthalmic lens, optionally but preferably in the presence of a hydrophilic vinylic monomer or crosslinker.

In another aspect, the invention provides an ophthalmic lens, the lens comprising a polymeric lens body; a layer of UV-absorbing polymer on the lens body; wherein the UV-absorbing polymer comprises UV-absorbing monomeric units, covalently bound radical-initiating moieties, and at least about 50%, preferably at least about 60%, more preferably at least about 70%, even more preferably at least about 80%, most preferably at least about 90%, by mole of carboxyl-containing monomeric units, wherein the layer of UV-absorbing polymer is grafted to the lens body by a photo induced grafting process.

In a further aspect the invention provides an ophthalmic lens, the lens comprising a polymeric lens body; a layer of UV-absorbing polymer on the lens body; wherein the UV-absorbing polymer comprises UV-absorbing monomeric units, covalently bound radical-initiating moieties, and at least about 50%, preferably at least about 60%, more preferably at least about 70%, even more preferably at least about 80%, most preferably at least about 90%, by mole of carboxyl-containing monomeric units, wherein the layer of UV-absorbing polymer is grafted to the lens body by a photo induced grafting process in the presence of a hydrophilic vinylic monomer or crosslinker.

The advantages of the invention will be set forth in part in the description which follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

FIG. 1 shows the UV absorbance spectra of storage solutions of contact lenses as described in Example 1 wherein 1) is for a lens treated for 20 min in a PAA-N20 solution and after autoclaving, 2) is for a lens treated for 20 min in a PAA-N20-Irg solution, and 5 min UV illumination in PBS solution and autoclaving and 3) is for a lens treated for 20 min in a PAA-N20-Irg solution, and 5 minutes UV illumination in an aqueous PEG-DA 700 solution and autoclaving. The scale on the x-axis showing UV absorbance is zero at y-axis level, 0.5 at the lowest line parallel to the y-axis, 1.0 at the next line parallel to the y-axis, and 1.5 at the highest line parallel to the y-axis.

DETAILED DESCRIPTION

Before the present methods are disclosed and described, it is to be understood that the aspects described below are not limited to specific compounds, steps, or uses as such may, of course, vary. It is also to be understood that the terminology used herein is for the purpose of describing particular aspects only and is not intended to be limiting.

In this specification and in the claims that follow, reference will be made to a number of terms that shall be defined to have the following meanings:

It must be noted that, as used in the specification and the appended claims, the singular forms "a," "an" and "the" include plural referents unless the context clearly dictates otherwise. Thus, for example, reference to "a monomer" includes mixtures of two or more such monomers, and the like.

"About" as used herein means that a number referred to as "about" comprises the recited number plus or minus 1-10% of that recited number.

"Optional" or "optionally" means that the subsequently described event or circumstance can or cannot occur, and that the description includes instances where the event or circumstance occurs and instances where it does not.

Unless defined otherwise, all technical and scientific terms used herein have the same meaning as commonly understood by one of ordinary skill in the art to which this invention belongs. As employed throughout the disclosure, the following terms, unless otherwise indicated, shall be understood to have the following meanings.

An "ophthalmic lens" refers to a contact lens and/or an intraocular lens. A "contact lens" refers to a structure that can be placed on or within a wearer's eye. A contact lens can correct, improve, or alter a user's eyesight, but that need not be the case. A "silicone hydrogel contact lens" refers to a contact lens comprising a silicone hydrogel material.

As used in this application, the term "hydrogel" or "hydrogel material" refers to a crosslinked polymeric material which is not water-soluble and can contain at least 10% by weight of water within its polymer matrix when fully hydrated.

A "silicone hydrogel" refers to a hydrogel containing silicone. A silicone hydrogel typically is obtained by copolymerization of a polymerizable composition comprising at least one silicone-containing vinylic monomer or at least one silicone-containing vinylic macromer or at least one silicone-containing prepolymer having ethylenically unsaturated groups.

A "vinylic monomer" refers to a compound that has one sole ethylenically-unsaturated group.

The term "olefinically unsaturated group" or "ethylenically unsaturated group" is employed herein in a broad sense and is intended to encompass any groups containing at least one >C=C< group. Exemplary ethylenically unsaturated groups include without limitation (meth)acryloyl

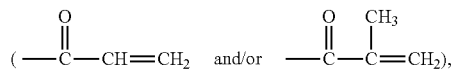

allyl, vinyl

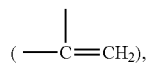

styrenyl, or other C=C containing groups.

The term "(meth)acrylamide" refers to methacrylamide and/or acrylamide.

The term "(meth)acrylate" refers to methacrylate and/or acrylate.

A "hydrophilic vinylic monomer", as used herein, refers to a vinylic monomer which can be polymerized to form a homopolymer that is water-soluble or can absorb at least 10 percent by weight of water.

A "hydrophobic vinylic monomer" refers to a vinylic monomer which can be polymerized to form a homopolymer that is insoluble in water and can absorb less than 10 percent by weight of water.

As used in this application, the term "macromer" or "prepolymer" refers to a medium and high molecular weight compound or polymer that contains two or more ethylenically unsaturated groups. Medium and high molecular weight typically means average molecular weights greater than 700 Daltons.

As used in this application, the term "crosslinker" refers to a compound having at least two ethylenically unsaturated groups. A "crosslinking agent" refers to a crosslinker having a molecular weight of about 700 Daltons or less.

As used in this application, the term "polymer" means a material formed by polymerizing/crosslinking one or more monomers or macromers or prepolymers.

As used in this application, the term "molecular weight" of a polymeric material (including monomeric or macromeric materials) refers to the weight-average molecular weight unless otherwise specifically noted or unless testing conditions indicate otherwise.

The molecular weight of a UV absorbing polymer of the invention can vary broadly. It can be from about 3000 to about 700.000, preferably from about 5000 to about 500.000.

The term "soluble", in reference to a compound or material in a solvent, means that the compound or material can be dissolved in the solvent to give a solution with a concentration of at least about 1% by weight at room temperature (i.e., a temperature of about 20° C. to about 30° C.).

The term "insoluble", in reference to a compound or material in a solvent, means that the compound or material can be dissolved in the solvent to give a solution with a concentration of less than 0.005% by weight at room temperature (as defined above).

The term "water-soluble" in reference to a polymer means that the polymer can be dissolved in water to an extent sufficient to form an aqueous solution of the polymer having a concentration of at least about 1% by weight at room temperature (defined above).

As used in this application, the term "water contact angle" refers to an average water contact angle (i.e., contact angles measured by Sessile Drop method), which is obtained by averaging measurements of contact angles.

As used in this application, the term "crosslinked coating" or "hydrogel coating" interchangeably is used to describe a crosslinked polymeric material having a three-dimensional network that can contain water when fully hydrated. The three-dimensional network of a crosslinked polymeric material can be formed by crosslinking of two or more linear or branched polymers through crosslinkages.

"Polymer" means a material formed by crosslinking or polymerizing one or more monomers.

The invention is generally directed to a cost-effective and time-efficient method for making UV-absorbing ophthalmic lenses, in particular, contact lenses. In contrast to the conventional method for making UV-absorbing ophthalmic lenses which involves copolymerizing a lens forming composition including a UV-absorbing vinylic monomer, a method of the invention involves a simple dipping process to apply a UV-absorbing coating onto an ophthalmic lens posterior to molding. The invention is partly based on the discovery that a layer (or coating) of a UV-absorbing polymer with carboxyl groups can be easily applied onto a cast-molded ophthalmic lens just by dipping the ophthalmic lens in a solution of the UV-absorbing polymer. The thickness and durability of the UV-absorbing coating can be controlled by using an organic solvent as the solvent or one of the solvent mixture in the UV-absorbing polymer solution and then rinsing with water or a mixture of water and at least one organic solvent. It is believed that when a solvent system containing at least one organic solvent is used for preparing a coating solution, it can swell an ophthalmic lens so that a portion of the UV-absorbing polymer may penetrate into the ophthalmic lens and increase the thickness of the UV-absorbing coating. The subsequent water-rinsing step can shrink the ophthalmic lens and embed partially the UV-absorbing polymer and increase the durability of the UV-absorbing coating.

The durability of the UV-absorbing coating is further improved by the UV-absorbing polymer comprising, in addition to UV-absorbing units and carboxyl-containing monomeric units, covalently bound radical-initiating moieties. The presence of these radical-initiating moieties allow a photo induced grafting (i.e., covalently attaching through the remaining residues of those radical-initiating moieties) of the UV-absorbing coating onto the ophthalmic lens in the absence or presence of a hydrophilic vinylic monomer or crosslinker. Such grafting can be achieved by irradiating the ophthalmic lens after the dipping step, optionally but preferably in the presence of a hydrophilic vinylic monomer or crosslinker.

The present invention can provide the following advantages. First, the incorporation of UV-absorbing agents to an ophthalmic lens is carried out after curing a lens-forming composition in a mold and thereby can overcome the disadvantages of using a UV-absorbing vinylic monomer described previously in the section "Background." Second, the whole process is based on wet chemistry (dipping ophthalmic lenses in a solution for a period of time). Such process can be easily implemented in a fully-automated, mass-production environment. Third, the process for incorporating UV-absorbers can be an integral part of a coating process for applying a hydrogel coating onto a contact lens. Fourth, the process including the photo-induced grafting step grafts the UV-absorbing polymer to the ophthalmic lens. This has the effect of reducing or preventing a remigration (i.e., leaching) of the UV-absorbing polymer from the ophthalmic lens into a solution in which the lens is stored. In other words the UV-absorbing polymer is better fixed to the ophthalmic lens than without the grafting step.

In one aspect, the invention provides a method for making UV-absorbing ophthalmic lenses, the method comprising the steps of: obtaining an ophthalmic lens, preferably a contact lens; dipping the ophthalmic lens in a coating solution comprising an organic solvent and a UV-absorbing polymer for a period of time sufficient to form a UV-absorbing coating on the ophthalmic lens; wherein the UV-absorbing polymer comprises UV-absorbing monomeric units, covalently bound radical-initiating moieties, and at least about 50%, preferably at least about 60%, more preferably at least about 70%, even more preferably at least about 80%, most preferably at least about 90%, by mole of carboxyl-containing monomeric units, irradiating the ophthalmic lens after the dipping step to obtain a photo-induced grafting of the UV-absorbing polymer to the ophthalmic, optionally but preferably in the presence of a hydrophilic vinylic monomer or crosslinker.

In accordance with the invention, a contact lens can be any contact lens, including soft and hard contact lens. A preferred soft contact lens is a silicone hydrogel contact lens.

A person skilled in the art will know well how to make contact lenses. For example, contact lenses can be produced in a conventional "spin-casting mold," as described for example in U.S. Pat. No. 3,408,429, or by the full cast-molding process in a static form, as described in U.S. Pat. Nos. 4,347,198; 5,508,317; 5,583,463; 5,789,464; and 5,849,810, or by lathe cutting of silicone hydrogel buttons as used in making customized contact lenses. In cast-molding, a lens formulation typically is dispensed into molds and cured (i.e., polymerized and/or crosslinked) in molds for making contact lenses. For production of preferred silicone hydrogel contact lenses, a lens formulation for cast-molding of contact lenses generally comprises at least one component selected from the group consisting of a silicone-containing vinylic monomer, a silicone-containing vinylic macromer, a hydrophilic vinylic monomer, a hydrophilic vinylic macromer, a hydrophobic vinylic monomer, and combinations thereof. It must be understood that a lens-forming composition can also comprise various components, such as, for example, a crosslinking agent, a visibility tinting agent (e.g., dyes, pigments, or mixtures thereof), antimicrobial agents (e.g., preferably silver nanoparticles), a bioactive agent, leachable lubricants, leachable tear-stabilizing agents, and mixtures thereof, as known to a person skilled in the art. Resultant silicone hydrogel contact lenses then can be subjected to extraction with an extraction solvent to remove unpolymerized components from the resultant lenses and to hydration process, as known by a person skilled in the art. In addition, a contact lens can be a colored contact lens (i.e., a contact lens having at least one colored pattern printed thereon as well known to a person skilled in the art).

A person skilled in the art knows very well how to prepare a lens formulation. Numerous non-silicone hydrogel lens formulation and silicone hydrogel lens formulations have been described in numerous patents and patent applications published by the filing date of this application. All of them can be used in obtaining a contact lens. A silicone hydrogel lens formulation for making commercial silicone hydrogel contact lenses, such as lotrafilcon A, lotrafilcon B, balafilcon A, galyfilcon A, senofilcon A, narafilcon A, narafilcon B, comfilcon A, enfilcon A, asmofilcon A, filcon II 3, can also be used in making silicone hydrogel contact lenses which then can be used to make UV-absorbing contact lenses according to a method of the invention.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. No. 4,444,711 to Schad; U.S. Pat. No. 4,460,534 to Boehm et al.; U.S. Pat. No. 5,843,346 to Morrill; and U.S. Pat. No. 5,894,002 to Boneberger et al., which are also incorporated herein by reference.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used. Other materials that allow UV light transmission could be used, such as quartz glass and sapphire.

In accordance with the invention, a UV-absorbing polymer comprises UV-absorbing monomeric units, covalently bound radical-initiating moieties, and at least about 50%, preferably at least about 60%, more preferably at least about 70%, even more preferably at least about 80%, most preferably at least about 90%, by mole of carboxyl-containing monomeric units. Each UV-absorbing monomeric unit comprises a UV-absorbing moiety which can be benzotriazole-moiety, benzophenone-moiety or triazine moiety, with benzotriazole-moiety or benzophenone-moiety as preferred UV-absorbing moiety, with benzotriazole-moiety as most preferred UV-absorbing moiety. As used in this application, the term "monomeric units" refers to repeating units of a polymer, which are derived from a vinylic monomer participated in a polymerization and optionally can be modified by a compound after polymerization.

Each covalently bound radical-initiating moiety introduced into a UV-absorbing polymer by using a functionalized radical-initiating compound suitable to be bound to carboxy groups of a precursor polymer or an intermediary UV-absorbing polymer. Functionalized radical-initiating compounds suitable to be bound to carboxy are known and described, for example, in WO 03/042724, WO 86/005778, EP-B 632 329 and EP-B 800 511. Preferred radical-initiating compounds are those of the Irgacure type.

A UV-absorbing polymer of the invention can be obtained from an intermediary UV-absorbing polymer obtained by copolymerizing a polymerizable mixture comprising at least one carboxyl-containing vinylic monomer and at least one UV-absorbing vinylic monomer in the presence or absence of a vinylic monomer, provided that the carboxyl-containing vinylic monomer is present in an amount of at least about 50%, preferably at least about 60%, more preferably at least about 70%, even more preferably at least about 80%, most preferably at least about 90% by mole in the polymerizable composition.

An intermediary UV-absorbing polymer so obtained can be further modified to include covalently bound radical-initiating moieties by reacting it with a functionalized radical-initiating compound in a coupling reaction, e.g. with an Irgacure type photoinitiator via the active ester route with N-(3-dimethylaminopropyl)-N'-ethylcarbo-diimid. Other "coupling reactions" described hereinafter can be used likewise to attach a functionalized radical-initiating compound to the intermediary UV-absorbing polymer.

Any UV-absorbing vinylic monomers can be used in the preparation of an intermediary UV-absorbing polymer of the invention. Examples of preferred UV-absorbing vinylic monomers include without limitation benzotriazole-containing vinylic monomers (e.g., 2-(2-hydroxy-5-vinylphenyl)-2H-benzotriazole, 2-(2-hydroxy-5-acrylyloxyphenyl)-2H-benzotriazole, 2-(2-hydroxy-3-methacrylamido methyl-5-tert octylphenyl) benzotriazole, 2-(2'-hydroxy-5'-methacrylamido-phenyl)-5-chlorobenzotriazole, 2-(2'-hydroxy-5'-methacrylamidophenyl)-5-methoxybenzotriazole, 2-(2'-hydroxy-5'-methacryloxypropyl-3'-t-butyl-phenyl)-5-chlorobenzotriazole, 2-(2'-hydroxy-5'-methacryloxyethylphenyl) benzotriazole, 2-(2'-hydroxy-5'-methacryloxypropyl-phenyl) benzotriazole, or combination thereof); benzophenone-containing vinyl monomers (e.g., 2-hydroxy-4-acryloxy alkoxy benzophenone, 2-hydroxy-4-methacryloxy alkoxy benzophenone, allyl-2-hydroxybenzo-phenone, and 2-hydroxy-4-methacryloxy benzophenone, or combinations thereof); or combination thereof. Benzotriaz-ole-containing vinyl monomers can be prepared according to procedures described in U.S. Pat. Nos. 3,299,173, 4,612, 358, 4,716,234, 4,528,311 (herein incorporated by reference in their entireties) or can be obtained from commercial suppliers. Benzophenone-containing vinyl monomers can be prepared according to procedures described in U.S. Pat. No. 3,162,676 (herein incorporated by reference in its entirety) or can be obtained from commercial suppliers.

Any functionalized radical-initiating compound suitable to be bound to carboxy group can be used in the preparation of the UV-absorbing polymer of the invention. A functionalized radical-initiating compound suitable to be bound to carboxy group comprises a group which is co-reactive to a carboxy group, such as amino or hydroxy group, preferably amino group. The radical-initiating part may belong to different types, for example to the thioxanthone type and preferably to the benzoin type.

In a preferred embodiment of the invention the covalent bonding between carboxy groups and the functionalized radical-initiating compound occurs via reaction of a carboxy group with a hydroxyl, amino or alkylamino group of the radical-initiating compound, for example by using a radical-initiating compound of formula (10a) of EP B1 1299753 which is incorporated by reference in relevant part. The reaction of carboxy groups with hydroxyl or amino groups of a radical-initiating compound of, for example formula 10a of EP B1 1299753 is well-known in the art and may be carried out, for example, as described in textbooks of organic chemistry.

Any suitable carboxyl-containing vinylic monomers can be used in the preparation of an intermediary UV-absorbing polymer of the invention. Examples of preferred carboxyl-containing vinylic monomers include without limitation acrylic acid, $C_1$-$C_{12}$ alkylacrylic acid (e.g., methacrylic acid, ethylacrylic acid, propylacrylic acid, butylacrylic acid, pentylacrylic acid, etc.), N,N-2-acrylamidoglycolic acid, beta-methyl-acrylic acid (crotonic acid), alpha-phenyl acrylic acid, beta-acryloxy propionic acid, sorbic acid, angelic acid, cinnamic acid, 1-carobxy-4-phenyl butadiene-1,3, itaconic acid, citraconic acid, mesaconic acid, glutaconic acid, aconitic acid, maleic acid, fumaric acid, tricarboxy ethylene, and combinations thereof. A UV-absorbing polymer is prepared from at least one carboxyl-containing vinylic monomer selected from the group preferably consisting of acrylic acid, methacrylic acid, ethylacrylic acid, propylacrylic acid, butylacrylic acid, pentylacrylic acid, and combinations thereof, more preferably consisting of acrylic acid, methacrylic acid, ethylacrylic acid, propylacrylic acid, and combinations thereof, even more preferably consisting of acrylic acid, methacrylic acid, ethylacrylic acid, and combinations thereof.

Alternatively, a UV-absorbing polymer of the invention can be obtained by sequentially (in no particular order) reacting a UV-absorbing compound and a radical-initiating compound or by reacting a mixture of a UV-absorbing compound and a radical-initiating compound, with (i.e., covalently attaching UV-absorbing moieties to) a precursor polymer having at least about 50%, preferably at least about 60%, more preferably at least about 70%, even more preferably at least about 80%, most preferably at least about 90%, by mole of carboxyl-containing monomeric units in a coupling reaction known to a person skilled in the art.

A "coupling reaction" is intended to describe any reaction between a pair of matching functional groups in the presence or absence of a coupling agent to form covalent bonds or linkages under various reaction conditions well known to a person skilled in the art, such as, for example, oxidationreduction conditions, dehydration condensation conditions, addition conditions, substitution (or displacement) conditions, Diels-Alder reaction conditions, cationic crosslinking conditions, ring-opening conditions, epoxy hardening conditions, and combinations thereof. Non-limiting examples of coupling reactions under various reaction conditions between a pair of matching co-reactive functional groups selected from the group preferably consisting of amino group (—NHR' as defined above), hydroxyl group, carboxylic acid group, acid halide groups (—COX, X═Cl, Br, or I), acid anhydrate group, aldehyde group, azlactone group, isocyanate group, epoxy group, aziridine group, thiol group, and amide groups (—CONH$_2$), are given below for illustrative purposes. A carboxylic acid group reacts with an amino group —NHR' in the presence of a coupling agent-carbodiimide (e.g., 1-ethyl-3-(3-dimethylaminopropyl) carbodiimide (EDC), N,N'-dicyclohexylcarbodiimide (DCC), 1-cylcohexyl-3-(2-morpholinoethyl)carbodiimide, diisopropyl carbodiimide, or mixtures thereof) to form an amide linkage; a carboxylic acid group reacts with an isocyanate group under heating to form an amide linkage; a carboxyl group reacts with an epoxy or aziridine group to form an ester bond; a carboxyl group reacts with a halide group (—Cl, —Br or —I) to form an ester bond; an amino group reacts with aldehyde group to form a Schiff base which may further be reduced; an amino group —NHR' reacts with an acid chloride or bromide group or with an acid anhydride group to form an amide linkage (—CO—NR'—); an amino group —NHR' reacts with an isocyanate group to form a urea linkage (—NR'—C(O)—NH—); an amino group —NHR' reacts with an epoxy or aziridine group to form an amine bond (C—NR'); an amino group reacts (ring-opening) with an azlactone group to form a linkage (—C(O)NH—CR$_1$R$_2$—(CH$_2$)$_r$—C(O)—NR'—); a hydroxyl reacts with an isocyanate to form a urethane linkage; a hydroxyl reacts with an epoxy or aziridine to form an ether linkage (—O—); a hydroxyl reacts with an acid chloride or bromide group or with an acid anhydride group to form an ester linkage; an hydroxyl group reacts with an azlactone group in the presence of a catalyst to form a linkage (—C(O)NH—CR$_1$R$_2$—(CH$_2$)$_r$—C(O)—O—); a thiol group (—SH) reacts with an isocyanate to form a thiocarbamate linkage (—N—C(O)—S—); a thiol group reacts with an epoxy or aziridine to form a thioether linkage (—S—); a thiol group reacts with an acid chloride or bromide group or with an acid anhydride group to form a thiolester linkage; a thiol group reacts with an azlactone group in the presence of a catalyst to form a linkage (—C(O)NH-alkylene-C(O)—S—); a thiol group reacts with a vinyl group based on thiol-ene reaction under thiol-ene reaction conditions to form a thioether linkage (—S—); and a thiol group reacts with an acryloyl or methacryloyl group based on Michael Addition under appropriate reaction conditions to form a thioether linkage.

It is also understood that coupling agents with two reactive functional groups may be used in the coupling reactions. For example, a diisocyanate, di-acid halide, di-carboxylic acid, di-azlactone, or di-epoxy compound can be used in the coupling of two hydroxyl, two amino groups, two carboxyl groups, two epoxy groups, or combination thereof; a diamine or dihydroxyl compound can be used in the coupling of two isocyanate, two epoxy, two aziridine, two carboxyl, two acid halide, or two azlactone groups, or combinations thereof.

The reactions conditions for the above described coupling reactions are taught in textbooks and are well known to a person skilled in the art.

Any polymer comprising at least about 50%, preferably at least about 60%, more preferably at least about 70%, even more preferably at least about 80%, most preferably at least about 90%, by mole of carboxyl-containing monomeric units can be used as precursor polymer in the preparation of a UV-absorbing polymer of the invention. Preferably, a precursor polymer is: a homopolymer of a carboxyl-containing vinylic monomer (acrylic acid or $C_1$-$C_{12}$ alkylacrylic acid); a copolymer of acrylic acid and $C_1$-$C_{12}$ alkylacrylic acid; a copolymer of a carboxyl-containing vinylic monomer (acrylic acid or $C_1$-$C_{12}$ alkylacrylic acid) and an amino-containing vinylic monomer (e.g., amino-$C_2$-$C_6$ alkyl (meth) acrylate, $C_1$-$C_6$ alkylamino-$C_2$-$C_6$ alkyl (meth)acrylate, allylamine, vinylamine, amino-$C_2$-$C_6$ alkyl (meth)acrylamide, $C_1$-$C_6$ alkylamino-$C_2$-$C_6$ alkyl (meth)acrylamide); a copolymer of a carboxyl-containing vinylic monomer (acrylic acid or $C_1$-$C_{12}$ alkylacrylic acid) and one or more hydrophilic vinylic monomers being free of carboxyl or amino group and selected from the group consisting of acrylamide (AAm), methacrylamide N,N-dimethylacrylamide (DMA), N,N-dimethyl methacrylamide (DMMA), N-vinylpyrrolidone (NVP), N,N,-dimethylaminoethylmethacrylate (DMAEM), N,N-dimethylaminoethylacrylate (DMAEA), N,N-dimethylaminopropyl methacrylamide (DMAPMAm), N,N-dimethylaminopropylacrylamide (DMAPAAm), glycerol methacrylate, 3-acryloylamino-1-propanol, N-hydroxyethyl acrylamide, N-[tris(hydroxymethyl) methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 2-hydroxyethyl (meth)acrylate, hydroxypropyl (meth)acrylate, $C_1$-$C_4$-alkoxy polyethylene glycol (meth)acrylate having a weight average molecular weight of up to 1500 Daltons, N-vinyl formamide, N-vinyl acetamide, N-vinyl isopropylamide, N-vinyl-N-methyl acetamide, allyl alcohol, vinyl alcohol (hydrolyzed form of vinyl acetate in the copolymer), and combinations thereof. More preferably, a precursor polymer is polyacrylic acid, polymethacrylic acid, poly($C_2$-$C_{12}$ alkylacrylic acid), poly(acrylic acid-co-methacrylic acid), poly[$C_2$-$C_{12}$ alkylacrylic acid-co-(meth) acrylic acid], poly(N,N-2-acrylamidoglycolic acid), poly [(meth)acrylic acid-co-acrylamide], poly[(meth)acrylic acid-co-vinylpyrrolidone], poly[$C_2$-$C_{12}$ alkylacrylic acid-co-acrylamide], poly[$C_2$-$C_{12}$ alkylacrylic acid-co-vinyl pyrrolidone], hydrolyzed poly[(meth)acrylic acid-co-vinylacetate], hydrolyzed poly[$C_2$-$C_{12}$ alkylacrylic acid-co-vinylacetate], or combinations thereof.

Any UV-absorbing compounds, which comprises UV-absorbing moieties and a reactive functional group selected from the group consisting of amino group, azlactone group, epoxy group, isocyanate group, aziridine group, and combination thereof, can be used in the invention. A preferred UV-absorbing compound having a benzotriazole-moiety, which can be used in the invention, is represented by formula I, II, or III

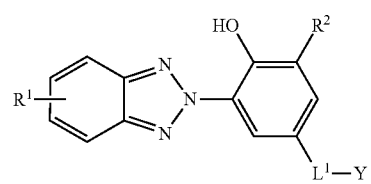

I

-continued

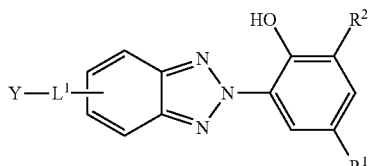

II

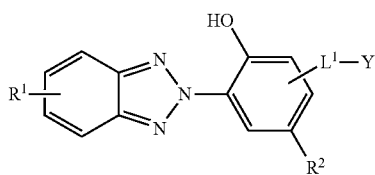

III wherein:

R¹ and R² independently of each other are hydrogen, a $C_1$-$C_{12}$ linear or branched alkyl group, a halogen (Cl or Br), a $C_6$ to $C_{24}$ aryl group, a $C_7$ to $C_{24}$ alkylaryl group, a $C_7$ to $C_{24}$ arylalkyl, or a $C_1$-$C_{12}$ linear or branched alkoxy group;

L¹ is a covalent bond or a divalent radical of —$X_a$-$E_1$-$X_b$-$E_2$-$X_c$— in which $X_a$ is a covalent bond, —O—, carbonyl

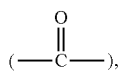

a divalent radical of —($R^aO$)$_n$— in which $R^a$ is a linear or branched $C_1$-$C_{12}$-alkylene and n is from 1 to 10,

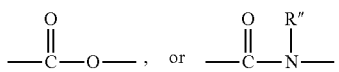

in which R″ is H or $C_1$-$C_8$ alkyl, $E_1$ and $E_2$ independently of each other are a covalent bond, a divalent radical of —($R^aO$)$_n$— in which $R^a$ and n are defined above,

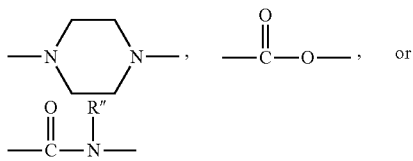

in which R″ is H or $C_1$-$C_8$ alkyl, a $C_1$ to $C_{12}$ linear or branched alkylene divalent radical, a cycloalkyl divalent radical with up to 40 carbon atoms, an alkylcycloalkyl divalent radical with up to 40 carbon atoms, an alkylaryl divalent radical with up to 40 carbon atoms, an arylalkylene divalent radical with up to 40 carbon atoms, or a dicarbonyl group having the formula —C(O)L²C(O)— in which L² is a $C_1$ to $C_{12}$ linear or branched alkylene divalent radical or —($R^{e1}$—O)$_{w1}$—($R^{e2}$—O)$_{w2}$—($R^{e3}$—O)$_{w3}$—, wherein $R^{e1}$, $R^{e2}$, and $R^{e3}$ independently of one another are a linear or branched $C_1$-$C_4$-alkylene and w1, w2 and w3 independently of one another are a number from 0 to 20 provided that the sum of (n+m+p) is 1 to 60, and $X_b$ and $X_c$ independently of each other are a covalent bond, carbonyl,

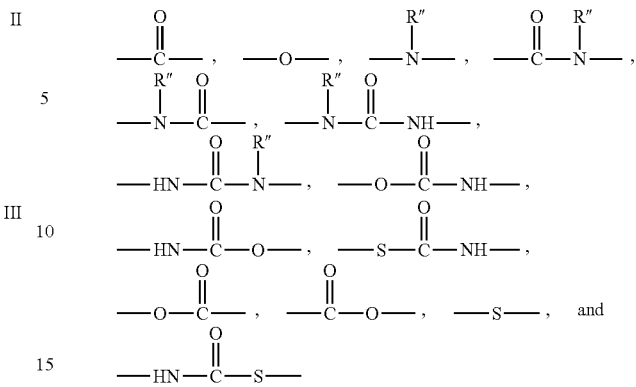

in which R″ is defined above; and

Y is an azlactone group, an epoxy group, an isocyanate group, an aziridine group, or an amino group of —NHR' in which R' is hydrogen or a $C_1$-$C_{12}$ unsubstituted or substituted, linear or branched alkyl group.

Examples of amino-containing UV-absorbing compounds of formula I, II or III include without limitation 2-(2'-hydroxy-3'-aminomethyl-5'-methylphenyl)-2H-benzotriazole, 2-(2'-hydroxy-5'-aminophenyl)-2H-benzotriazole, 2-(2'-hydroxy-4'-(3-aminopropoxy)phenyl)-2H-benzotriazole, 2-(2'-hydroxy-4'-ethylaminophenyl)-5-chloro-benzotriazole. Alternatively, amino-containing UV-absorbing compounds of formula I, II, or III can be prepared from a benzotriazole-containing vinyl monomer (any one of those described above) by reacting its ethylenically-unsaturated group with an aminomercaptan (e.g., 2-aminoethanethiol) according to Michael Addition or thiol-ene reaction well known to a person skilled in the art.

UV-absorbing compounds of formula I, II or III in which Y is an azlactone group, an epoxy group, or an isocyanate group can be prepared from a bezotriazole compound having one hydroxyalkoxy group or an amino group by reacting it with an excess molar equivalent amount of a di-azlactone compound, a di-epoxy compound, or a di-isocyanate compound under customary coupling reaction condition well known to a person skilled in the art.

Examples of di-epoxy compounds are neopentyl glycol diglycidyl ether, 1,6-hexanediol diglycidyl ether, ethylene glycol diglycidyl ether, diethylene glycol diglycidyl ether, polyethylene glycol diglycidyl ether, propylene glycol diglycidyl ether, and dipropylene glycol diglycidyl ether. Such di-epoxy compounds are available commercially (e.g., those DENACOL series di-epoxy compounds from Nagase ChemteX Corporation). Examples of $C_{10}$-$C_{24}$ di-azlactone compounds include those described in U.S. Pat. No. 4,485,236 (herein incorporated by reference in its entirety). Examples of $C_4$-$C_{24}$ diisocyanates can be used in the invention. diisocyanates include without limitation isophorone diisocyanate, hexamethyl-1,6-diisocyanate, 4,4'-dicyclohexylmethane diisocyanate, toluene diisocyanate, 4,4'-diphenyl diisocyanate, 4,4'-diphenylmethane diisocyanate, p-phenylene diisocyanate, 1,4-phenylene 4,4'-diphenyl diisocyanate, 1,3-bis-(4,4'-isocyanto methyl)cyclohexane, cyclohexane diisocyanate, and combinations thereof.

In formula I, II or III, Y preferably is an amino group of —NHR' in which R' is hydrogen or a $C_1$-$C_{12}$ unsubstituted or substituted, linear or branched alkyl group.

A preferred UV-absorbing compound having a benzophenone-moiety, which can be used in the invention, is represented by formula IV

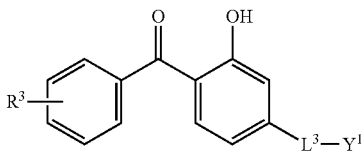

in which

R³ is hydrogen, a $C_1$-$C_{12}$ linear or branched alkyl group, a halogen, a $C_6$ to $C_{24}$ aryl group, a $C_7$ to $C_{24}$ alkylaryl group, a $C_7$ to $C_{24}$ arylalkyl, or a $C_1$-$C_{12}$ linear or branched alkoxy group;

L³ is a covalent bond or a divalent radical of —$X_a$-$E_1$-$X_b$-$E_2$-$X_c$— in which $X_a$ is a covalent bond, —O—, carbonyl

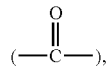

a divalent radical of —($R^a$O)$_n$— in which $R^a$ is a linear or branched $C_1$-$C_{12}$-alkylene and n is from 1 to 10,

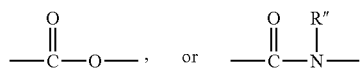

in which R″ is H or $C_1$-$C_8$ alkyl, $E_1$ and $E_2$ independently of each other are a covalent bond, a divalent radical of —($R^a$O)$_n$— in which $R^a$ and n are defined above,

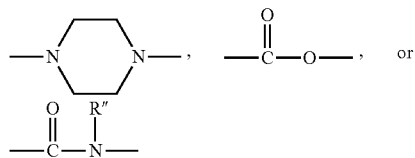

in which R″ is H or $C_1$-$C_8$ alkyl, a $C_1$ to $C_{12}$ linear or branched alkylene divalent radical, a cycloalkyl divalent radical with up to 40 carbon atoms, an alkylcycloalkyl divalent radical with up to 40 carbon atoms, an alkylaryl divalent radical with up to 40 carbon atoms, an arylalkylene divalent radical with up to 40 carbon atoms, or a dicarbonyl group having the formula —C(O)L²C(O)— in which L² is a $C_1$ to $C_{12}$ linear or branched alkylene divalent radical or —($R^{e1}$—O)$_{w1}$—($R^{e2}$—O)$_{w2}$—($R^{e3}$—O)$_{w3}$—, wherein $R^{e1}$, $R^{e2}$, and $R^{e3}$ independently of one another are a linear or branched $C_1$-$C_4$-alkylene and w1, w2 and w3 independently of one another are a number from 0 to 20 provided that the sum of (n+m+p) is 1 to 60, and $X_b$ and $X_c$ independently of each other are a covalent bond, carbonyl,

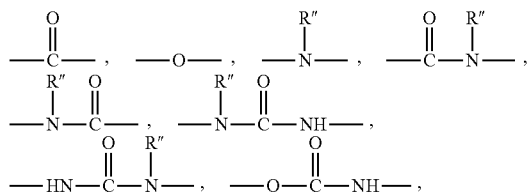

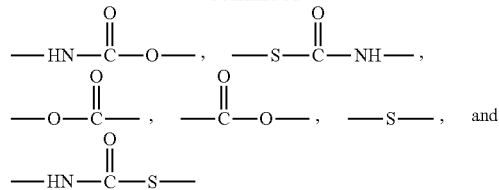

in which R″ is defined above; and

Y¹ is an azlactone group, an epoxy group, an isocyanate group, an aziridine group, or an amino group of —NHR in which R is hydrogen or a $C_1$-$C_{12}$ unsubstituted or substituted, linear or branched alkyl group.

In formula IV, Y¹ preferably is an amino group of —NHR in which R is hydrogen or a $C_1$-$C_{20}$ unsubstituted or substituted, linear or branched alkyl group.

Amino-containing UV-absorbing compounds of formula IV can be prepared from a benzophenone-containing vinyl monomer by reacting its ethylenically-unsaturated group with an aminomercaptan (e.g., 2-aminoethanethiol) according to Michael Addition or thiol-ene reaction well known to a person skilled in the art. Resultants amino-containing UV-absorbing compounds of formula IV then can be used directly in the invention or in preparing UV-absorbing compounds of formula IV in which Y¹ is an azlactone group, an epoxy group, or an isocyanate group, by reacting an amino-containing UV-absorbing compounds of formula IV with an excess molar equivalent amount of a di-azlactone compound, a di-epoxy compound, or a di-isocyanate compound under customary coupling reaction condition well known to a person skilled in the art.

In a preferred embodiment, the UV-absorbing compound comprises one or more compounds of formula I, II, III or IV, preferably of formula I, II or III, in which Y and Y¹ is an amino group of —NHR′ in which R′ is hydrogen or a $C_1$-$C_{12}$ unsubstituted or substituted, linear or branched alkyl group, R¹ and R² independent of each other is hydrogen, halogen, $C_1$-$C_6$ linear or branched alkoxy, $C_1$-$C_{12}$ linear or branched alkyl (preferably t-butyl), or $C_6$-$C_{15}$ aryl, L is a covalent bond or a divalent radical of —$X_a$-$E_1$-$X_b$-$E_2$-$X_c$— in which $X_a$ is a covalent bond or

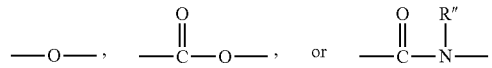

in which R″ is H or $C_1$-$C_8$ alkyl, $E_1$ and $E_2$ independently of each other are a covalent bond, a divalent radical of —($R^a$O)$_n$— in which $R^a$ is a linear or branched $C_1$-$C_{12}$-alkylene and n is from 1 to 10, a $C_1$ to $C_{12}$ linear or branched alkylene divalent radical, a cycloalkyl divalent radical with up to 12 carbon atoms, an alkylcycloalkyl divalent radical with up to 20 carbon atoms, an alkylphenyl divalent radical with up to 20 carbon atoms, or an phenylalkylene divalent radical with up to 20 carbon atoms, $X_b$ and $X_c$ independently of each other are a covalent bond, carbonyl,

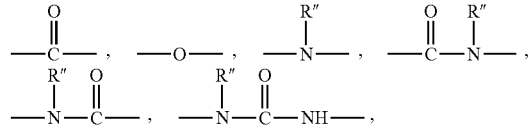

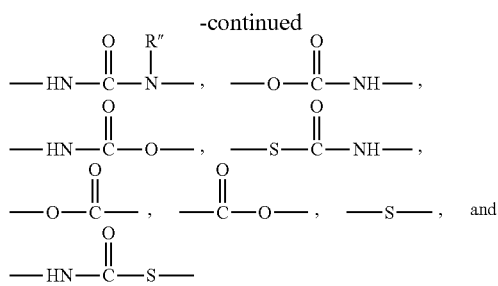

in which R″ is defined above; and Y is an amino group of —NHR in which R is hydrogen or a $C_1$-$C_6$ unsubstituted or substituted, linear or branched alkyl group.

A preferred embodiment of an intermediary UV-absorbing polymer is a copolymer of acrylic acid or methacrylic acid with a UV-absorbing vinylic monomer, preferably comprising structural units of the following formula

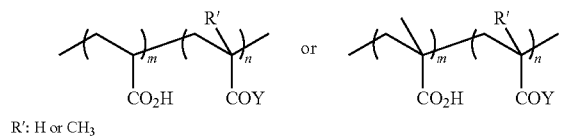

R′: H or $CH_3$ wherein Y is the radical of a UV-absorbing moiety, the total of (m+n) is an integer from 21 to 10000, and the ratio of m:n is from 200:1 to 20:1.

In any given UV-absorbing polymer of the invention the covalently bound radical-initiating moieties are present in the UV-absorbing polymer preferably from about 3 to about 15 mole percent, more preferably from about 5 to about 10 mole percent.

In any given UV-absorbing polymer of the invention the UV-absorbing monomeric units are present in the UV-absorbing polymer preferably from about 4 to about 15 mole percent, more preferably from about 5 to 12 mole percent.

In any given UV-absorbing polymer of the invention the ratio of UV-absorbing monomeric units to covalently bound radical-initiating moieties is from 100:1 to 1:100, preferably from 10:1 to 1:10, while at the same time the mole percent of carboxyl-containing units is at least about 50%, preferably at least about 60%, more preferably at least about 70%, even more preferably at least about 80%, most preferably at least about 90%.

A solution of a UV-absorbing polymer for forming a UV-absorbing layer (coating) on contact lenses can be prepared by dissolving one or more UV-absorbing polymers in water, a mixture of water and one or more organic solvents miscible with water, an organic solvent, or a mixture of one or more organic solvent. Examples of preferred organic solvents include without limitation, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether, dipropylene glycol dimethyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3, 4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methylpyrrolidinone, and mixtures thereof.

Preferably, the UV-absorbing polymers are dissolved in a mixture of water and one or more organic solvents, an organic solvent, or a mixture of one or more organic solvent. It is believed that a solvent system containing at least one organic solvent can swell a contact lens so that a portion of the UV-absorbing polymer may penetrate into the contact lens and increase the thickness and durability of the UV-absorbing coating. Any organic solvents described above can be used in preparation of a solution of the UV-absorbing polymer, so long as it can dissolve the UV-absorbing polymer.

Contacting of a contact lens with a solution of a UV-absorbing polymer can be carried in any manner known to a person skilled in the art. A preferred contact method is dipping a contact lens in the solution or spraying the contact with the solution, with the former being preferred. It is understood that, before contacting with a solution of a UV-absorbing polymer, a contact lens can be subjected to extraction with an extraction solvent to remove unpolymerized components from the molded lens, as known by a person skilled in the art. Alternatively, extraction step can be carried out after a coating (layer) of the UV-absorbing polymer is applied onto the contact lens.

In a preferred embodiment, the organic solvent is present in an amount of at least about 60%, preferably at least about 70%, more preferably at least about 80%, even more preferably at least about 90%, most preferably at least about 95% by weight in the coating solution, and the method of the invention further comprises a step of rinsing the ophthalmic lens having the UV-absorbing coating thereon with a mixture of water and at most about 50%, preferably at most about 40%, more preferably at most about 30%, even more preferably at most about 20%, most preferably at most about 10% by weight of an organic solvent.

Grafting process can be initiated, for example, thermally by the action of heat or preferably by irradiation, particularly by UV radiation. Suitable light sources for the irradiation are know to the artisan and comprise for example mercury lamps, high-pressure mercury lamps, xenon lamps, carbon arc lamps or sunlight. The time period of irradiation may depend for example on the desired properties of the resulting ophthalmic lens but is usually in the range of up to 30 minutes, preferably from 10 seconds to 10 minutes, and particularly preferably from 0.5 to 5 minutes. It is advantageous to carry out the irradiation in an atmosphere of inert gas. The irradiation can also be performed in solution, for example in a PBS solution of pH 7.0. A suitable lamp is a Hamamatsu light source used for about 5 minutes with an intensity of about 4 to 6 mW/cm2. After grafting any non-covalently bonded polymers, oligomers or non-reacted macromonomers formed can be removed, for example by treatment with suitable solvent.

Nearly any hydrophilic vinylic monomer can be used in the invention. Suitable hydrophilic vinylic monomers are, without this being an exhaustive list, (meth)acrylamide, di-alkyl($C_1$ to $C_6$) (meth)acrylamide, ($C_1$ to $C_6$) alkyl (meth) acrylamide, hydroxyl-substituted lower alkyl ($C_1$ to $C_6$) (meth)acrylamide, hydroxyl-substituted lower alkyl ($C_1$ to $C_6$) (meth)acrylates, hydroxyl-substituted lower alkyl vinyl ethers, N-vinylpyrrole, N-vinyl-2-pyrrolidone, 2-vinyloxazoline, 2-vinyl-4,4'-dialkyloxazolin-5-one, 2- and 4-vinylpyridine, olefinically unsaturated carboxylic acids having a total of 3 to 6 carbon atoms, amino(lower alkyl)—(where the term "amino" also includes quaternary ammonium), mono(lower alkylamino)(lower alkyl) and di(lower alkylamino)(lower alkyl)acrylates and methacrylates, allyl alcohol, N-vinyl alkylamide, N-vinyl-N-alkylamide, and the like.

Preferred hydrophilic vinylic monomers are N,N-dimethylacrylamide (DMA), N,N-dimethylmethacrylamide (DMMA), 2-acrylamidoglycolic acid monohydrate, 3-acryloylamino-1-propanol, N-hydroxyethyl acrylamide, N-[tris(hydroxymethyl)methyl]-acrylamide, N-methyl-3-methylene-2-pyrrolidone, 2-hydroxyethyl methacrylate (HEMA), 2-hydroxyethyl acrylate (HEA), hydroxypropyl acrylate, hydroxypropyl methacrylate (HPMA), trimethylammonium 2-hydroxy propylmethacrylate hydrochloride, aminopropyl methacrylate hydrochloride, dimethylaminoethyl methacrylate (DMAEMA), glycerol methacrylate (GMA), N-vinyl-2-pyrrolidone (NVP), allyl alcohol, vinylpyridine, acrylic acid, a $C_1$-$C_4$-alkoxy polyethylene glycol (meth)acrylate having a weight average molecular weight of from 200 to 1500, for example poly(ethylene glycol)-methylether methacrylate, methacrylic acid, N-vinyl formamide, N-vinyl acetamide, N-vinyl isopropylamide, N-vinyl-N-methyl acetamide, allyl alcohol, N-vinyl caprolactam, and mixtures thereof.

The grafting step can further be conducted in the presence of a hydrophilic vinylic monomer and a crosslinker, or in the presence of a crosslinker alone, as long as the crosslinker is hydrophilic. Such crosslinker has at least two ethylenically unsaturated groups, and can be a crosslinking agent (i.e., a compound comprising two or more ethylenically unsaturated groups and having a molecular weight of 700 daltons or less).

Examples of hydrophilic vinylic monomer and preferred such monomers have been provided hereinbefore. Especially preferred is a $C_1$-$C_4$-alkoxy polyethylene glycol (meth)acrylate having a weight average molecular weight of from 200 to 1500, for example poly(ethylene glycol)-methylether methacrylate.

Examples of preferred crosslinking agents include without limitation tetra(ethyleneglycol) diacrylate, tri(ethyleneglycol) diacrylate, ethyleneglycol diacrylate, di(ethyleneglycol) diacrylate, tetraethyleneglycol dimethacrylate, triethyleneglycol dimethacrylate, ethyleneglycol dimethacrylate, di(ethyleneglycol) dimethacrylate, trimethylopropane trimethacrylate, penta-erythritol tetramethacrylate, bisphenol A dimethacrylate, vinyl methacrylate, ethylene-diamine dimethyacrylamide, glycerol dimethacrylate, triallyl isocyanurate, triallyl cyanurate, allylmethacrylate, dimers (e.g., 1,3-bis(methacrylamidopropyl)-1,1,3,3-tetrakis(trimethylsiloxy)disiloxane, 1,3-bis(N-methacrylamidopropyl)-1,1,3,3-tetrakis-(trimethylsiloxy)disiloxane, 1,3-bis(methacrylamidobutyl)-1,1,3,3-tetrakis(trimethylsiloxy)-disiloxane, 1,3-bis(acrylamide-propyl)-1,1,3,3-tetrakis(trimethylsiloxy) disiloxane, 1,3-bis(methacryloxyethylureidopropyl)-1,1,3,3-tetrakis(trimethylsiloxy)disiloxane) disclosed in U.S. Pat. No. 4,711,943 (herein incorporated by reference in its entirety), an acrylamide-modified polyvinylalcohol, for example as disclosed in WO02/071106 and exemplified herein, and combinations thereof. Preferred cross-linking agents are poly(ethyleneglycol) diacrylate, tetra(ethyleneglycol) diacrylate, tri(ethyleneglycol) diacrylate, ethyleneglycol diacrylate, di(ethyleneglycol) diacrylate, triallyl isocyanurate, or triallyl cyanurate. An even more preferred crosslinking agent is poly(ethyleneglycol) diacrylate (Mn about 700 Da, Aldrich #455008) and an acrylamide-modified polyvinylalcohol, for example as disclosed in example 2 of WO02/071106.

In accordance with the invention, heating is performed preferably by autoclaving a contact lens with the UV-absorbing coating thereon in a packaging solution (i.e., a buffered aqueous solution) including a water-soluble thermally crosslinkable hydrophilic polymeric material in a sealed lens package at a temperature of from about 118° C. to about 125° C. for approximately 20-90 minutes. In accordance with this embodiment of the invention, the packaging solution is a buffered aqueous solution which is ophthalmically safe after autoclave. Alternatively, is performed preferably by autoclaving a contact lens, which comprises a UV-absorbing coating immersed in a packaging solution (i.e., a buffered aqueous solution) in a sealed lens package at a temperature of from about 118° C. to about 125° C. for approximately 20-90 minutes.

Lens packages (or containers) are well known to a person skilled in the art for autoclaving and storing a soft contact lens. Any lens packages can be used in the invention. Preferably, a lens package is a blister package which comprises a base and a cover, wherein the cover is detachably sealed to the base, wherein the base includes a cavity for receiving a sterile packaging solution and the contact lens.

Lenses are packaged in individual packages, sealed, and sterilized (e.g., by autoclave at about 120° C. or higher for at least 30 minutes) prior to dispensing to users. A person skilled in the art will understand well how to seal and sterilize lens packages.

In accordance with the invention, a packaging solution contains at least one buffering agent to maintain a pH of the packaging solution in a physiologically acceptable range of about 6 to about 8.5, one or more other tonicity agents to provide a tonicity of from about 200 to about 450 milliosmol (mOsm), preferably from about 250 to about 350 mOsm, and other ingredients known to a person skilled in the art. Examples of other ingredients include without limitation, surfactants/lubricants, antibacterial agents, preservatives, and/or water-soluble viscosity builders (e.g., cellulose derivatives, polyvinyl alcohol, polyvinylpyrrolidone).

Examples of physiologically compatible buffering agents are boric acid, borates, e.g. sodium borate, citric acid, citrates, e.g. potassium citrate, bicarbonates, e.g. sodium bicarbonate, TRIS (2-amino-2-hydroxymethyl-1,3-propanediol), Bis-Tris (Bis-(2-hydroxyethyl)-imino-tris-(hydroxymethyl)-methane), bis-aminopolyols, triethanolamine, ACES (N-(2-hydroxyethyl)-2-aminoethanesulfonic acid), BES (N,N-Bis(2-hydroxyethyl)-2-aminoethanesulfonic acid), HEPES (4-(2-hydroxyethyl)-1-piperazineethanesulfonic acid), MES (2-(N-morpholino)ethanesulfonic acid), MOPS (3-[N-morpholino]-propanesulfonic acid), PIPES (piperazine-N,N'-bis(2-ethanesulfonic acid), TES (N-[Tris(hydroxymethyl)methyl]-2-aminoethanesulfonic acid), salts thereof, phosphate buffers, e.g. $Na_2HPO_4$, $NaH_2PO_4$, and $KH_2PO_4$ or mixtures thereof. A preferred bis-aminopolyol is 1,3-bis(tris[hydroxymethyl]-methylamino)propane (bis-TRIS-propane). The amount of each buffer agent in a packaging solution is preferably from 0.001% to 2%, preferably from 0.01% to 1%; most preferably from about 0.05% to about 0.30% by weight.

Suitable ocularly acceptable tonicity agents include, but are not limited to sodium chloride, potassium chloride, glycerol, propylene glycol, polyols, mannitols, sorbitol, xylitol and mixtures thereof.

A packaging solution of the invention has a viscosity of from about 1 centipoise to about 20 centipoises, preferably from about 1.2 centipoises to about 10 centipoises, more preferably from about 1.5 centipoises to about 5 centipoises, at 25° C.

In a preferred embodiment, a method of the invention further comprises a step of dipping the contact lens in a solution of blue light-absorbing polymer having blue light-absorbing monomeric units and at least about 50%, preferably at least about 60%, more preferably at least about 70%, even more preferably at least about 80%, most preferably at least about 90%, by mole of carboxyl-containing monomeric units. The term "blue light-absorbing monomeric units" refers to repeating units of a polymer each of which comprises a blue light-absorbing moiety. A "blue light-absorbing moiety" refers to an organic group which can render a compound containing such group to absorb light in the region of from about 400 nm to about 480 nm. One preferred blue light-absorbing moiety is nitrophenylpyrrolidine group. A blue light absorbing polymer can be prepared according to procedures similar to those described above for UV-absorbing polymers. For example, a blue light-absorbing polymer can be prepared by polymerizing a polymerizable mixture comprising at least one carboxyl-containing vinylic monomer (any one of those described above) and at least one blue light-absorbing vinylic monomer, or alternatively by reacting a blue light-absorbing compound having a reactive functional group (e.g., amino group, azlactone group, epoxy group, isocyanate group, aziridine group, and combination thereof, with amino groups as most preferred reactive functional groups) with a precursor polymer (any one of those described above for preparing UV-absorbing polymers) containing carboxyl and optional amino groups.

In another preferred embodiment, a contact lens, preferably a silicone hydrogel contact lens obtained according to a method of the invention has a surface wettability characterized by having an averaged water contact angle of about 90 degrees or less, preferably about 80 degrees or less, more preferably about 70 degrees or less, even more preferably about 60 degrees or less, most preferably about 50 degrees or less.

It should be understood that although in this aspect of the invention various embodiments including preferred embodiments of the invention may be separately described above, they can be combined and/or used together in any desirable fashion to arrive at different embodiments of a contact lenses of the invention.

In another aspect, the invention provides an ophthalmic lens, the lens comprising a polymeric lens body; a layer of UV-absorbing polymer on the lens body; and a hydrogel grafted onto the layer of the UV-absorbing polymer, wherein the UV-absorbing polymer comprises UV-absorbing monomeric units and at least about 50%, preferably at least about 60%, more preferably at least about 70%, even more preferably at least about 80%, most preferably at least about 90%, by mole of carboxyl-containing monomeric units, wherein the hydrogel graft is obtained by a photo induced grafting process made possible by irradiating the covalently bound radical-initiating moieties in the presence of a hydrophilic vinylic monomer or crosslinker.

All of the various embodiments as described above for the previous aspect of the invention can be used, alone or in any combination, in this aspect of the invention.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Although various aspects and various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part or can be combined in any manner and/or used together. Therefore, the spirit and scope of the appended claims should not be limited to the description of the preferred versions contained therein.

EXAMPLES

General Remarks

Oxygen Permeability Measurements

The apparent oxygen permeability of a lens and oxygen transmissibility of a lens material is determined according to a technique similar to the one described in U.S. Pat. No. 5,760,100 and in an article by Winterton et al., (The Cornea: Transactions of the World Congress on the Cornea 111, H. D. Cavanagh Ed., Raven Press: New York 1988, pp 273-280), both of which are herein incorporated by reference in their entireties. Oxygen fluxes (J) are measured at 34° C. in a wet cell (i.e., gas streams are maintained at about 100% relative humidity) using a Dk1000 instrument (available from Applied Design and Development Co., Norcross, Ga.), or similar analytical instrument. An air stream, having a known percentage of oxygen (e.g., 21%), is passed across one side of the lens at a rate of about 10 to 20 $cm^3$/min., while a nitrogen stream is passed on the opposite side of the lens at a rate of about 10 to 20 $cm^3$/min. A sample is equilibrated in a test media (i.e., saline or distilled water) at the prescribed test temperature for at least 30 minutes prior to measurement but not more than 45 minutes. Any test media used as the overlayer is equilibrated at the prescribed test temperature for at least 30 minutes prior to measurement but not more than 45 minutes. The stir motor's speed is set to 1200±50 rpm, corresponding to an indicated setting of 400±15 on the stepper motor controller. The barometric pressure surrounding the system, $P_{measured}$, is measured. The thickness (t) of the lens in the area being exposed for testing is determined by measuring about 10 locations with a Mitotoya micrometer VL-50, or similar instrument, and averaging the measurements. The oxygen concentration in the nitrogen stream (i.e., oxygen which diffuses through the lens) is measured using the DK1000 instrument. The apparent oxygen permeability of the lens material, $Dk_{app}$, is determined from the following formula:

$$Dk_{app}=Jt/(P_{oxygen})$$

where J=oxygen flux [microliters $O_2/cm^2$-minute]
$P_{oxygen}=(P_{measured}-P_{water}$ vapor)=(% $O_2$ in air stream) [mm Hg]=partial pressure of oxygen
in the air stream
$P_{measured}$=barometric pressure (mm Hg)
$P_{water}$ vapor=0 mm Hg at 34° C. (in a dry cell) (mm Hg)
$P_{water}$ vapor=40 mm Hg at 34° C. (in a wet cell) (mm Hg)
t=average thickness of the lens over the exposed test area (mm)
$Dk_{app}$ is expressed in units of barrers.

The apparent oxygen transmissibility (Dk/t) of the material may be calculated by dividing the apparent oxygen permeability ($Dk_{app}$) by the average thickness (t) of the lens.

The above described measurements are not corrected for the so-called boundary layer effect which is attributable to the use of a water or saline bath on top of the contact lens during the oxygen flux measurement. The boundary layer effect causes the reported value for the apparent Dk of a silicone hydrogel material to be lower than the actual intrinsic Dk value. Further, the relative impact of the boundary layer effect is greater for thinner lenses than with thicker lenses. The net effect is that the reported Dk appear to change as a function of lens thickness when it should remain constant.

The intrinsic Dk value of a lens can be estimated based on a Dk value corrected for the surface resistance to oxygen flux caused by the boundary layer effect as follows.

Measure the apparent oxygen permeability values (single point) of the reference lotrafilcon A (Focus® N&D® from CIBA VISION CORPORATION) or lotrafilcon B (AirOptix™ from CIBA VISION CORPORATION) lenses using the same equipment. The reference lenses are of similar optical power as the test lenses and are measured concurrently with the test lenses.

Measure the oxygen flux through a thickness series of lotrafilcon A or lotrafilcon B (reference) lenses using the same equipment according to the procedure for apparent Dk measurements described above, to obtain the intrinsic Dk value ($Dk_i$) of the reference lens. A thickness series should cover a thickness range of approximately 100 μm or more. Preferably, the range of reference lens thicknesses will bracket the test lens thicknesses. The $Dk_{app}$ of these reference lenses must be measured on the same equipment as the test lenses and should ideally be measured contemporaneously with the test lenses. The equipment setup and measurement parameters should be held constant throughout the experiment. The individual samples may be measured multiple times if desired.

Determine the residual oxygen resistance value, $R_r$, from the reference lens results using equation 1 in the calculations.

$$R_r = \frac{\sum\left(\frac{t}{Dk_{app}} - \frac{t}{Dk_i}\right)}{n} \quad (1)$$

in which t is the thickness of the test lens (i.e., the reference lens too), and n is the number of the reference lenses measured. Plot the residual oxygen resistance value, $R_r$, vs. t data and fit a curve of the form Y=a+bX where, for the jth lens, $Y_j=(\Delta P/J)_j$ and $X=t_j$. The residual oxygen resistance, $R_r$, is equal to a.

Use the residual oxygen resistance value determined above to calculate the correct oxygen permeability $Dk_c$ (estimated intrinsic Dk) for the test lenses based on Equation 2.

$$Dk_c = t/[(t/Dk_a) - R_r] \quad (2)$$

The estimated intrinsic Dk of the test lens can be used to calculate what the apparent Dk ($Dk_{a\_std}$) would have been for a standard thickness lens in the same test environment based on Equation 3. The standard thickness ($t_{std}$) for lotrafilcon A=85 μm. The standard thickness for lotrafilcon B=60 μm.

$$Dk_{a\_std} = t_{std}/[(t_{std}/Dk_c) + R_{r\_std}] \quad (3)$$

Ion Permeability Measurements.

The ion permeability of a lens is measured according to procedures described in U.S. Pat. No. 5,760,100 (herein incorporated by reference in its entirety. The values of ion permeability reported in the following examples are relative ionoflux diffusion coefficients ($D/D_{ref}$) in reference to a lens material, Alsacon, as reference material. Alsacon has an ionoflux diffusion coefficient of $0.314 \times 10^{-3}$ mm²/minute.

Surface Wettability Tests.

Water contact angle on a contact lens is a general measure of the surface wettability of the contact lens. In particular, a low water contact angle corresponds to more wettable surface. Average contact angles (Sessile Drop) of contact lenses are measured using a VCA 2500 XE contact angle measurement device from AST, Inc., located in Boston, Mass. This equipment is capable of measuring advancing or receding contact angles or sessile (static) contact angles. The measurements are performed on fully hydrated contact lenses and immediately after blot-drying as follows. A contact lens is removed from the vial and washed 3 times in ~200 ml of fresh DI water in order to remove loosely bound packaging additives from the lens surface. The lens is then placed on top of a lint-free clean cloth (Alpha Wipe TX1009), dabbed well to remove surface water, mounted on the contact angle measurement pedestal, blown dry with a blast of dry air and finally the sessile drop contact angle is automatically measured using the software provided by the manufacturer. The DI water used for measuring the contact angle has a resistivity >18MΩcm and the droplet volume used is 2 μl. Typically, uncoated silicone hydrogel lenses (after autoclave) have a sessile drop contact angle around 120 degrees. The tweezers and the pedestal are washed well with Isopropanol and rinsed with DI water before coming in contact with the contact lenses.

Coating Intactness Tests.

The intactness of a hydrophilic coating on the surface of a contact lens can be tested according to Sudan Black stain test as follow. Contact lenses with a hydrophilic coating (an LbL coating, a plasma coating, or any other coatings) are dipped into a Sudan Black dye solution (Sudan Black in vitamin E oil) and then rinsed extensively in water. Sudan Black dye is hydrophobic and has a great tendency to be absorbed by a hydrophobic material or onto a hydrophobic lens surface or hydrophobic spots on a partially coated surface of a hydrophobic lens (e.g., silicone hydrogel contact lens). If the hydrophilic coating on a hydrophobic lens is intact, no staining spots should be observed on or in the lens. All of the lenses under test are fully hydrated. If a contact lens under test has a hydrophobic lens surface or hydrophobic spots on a partially coated surface of a hydrophobic lens, the contact lens is stained or staining spots can be observed on or in the lens.

Tests of Coating Durability.

The lenses are digitally rubbed with Solo-Care® multi-purpose lens care solution for 30 times and then rinsed with saline. The above procedure is repeated for a given times, e.g., from 1 to 30 times, (i.e., number of consecutive digital rubbing tests which imitate cleaning and soaking cycles). The lenses are then subjected to Sudan Black test (i.e., coating intactness test described above) to examine whether the hydrophilic coating is still intact. To survive digital rubbing test, there is no significantly increased staining spots (e.g., staining spots covering no more than about 5% of the total lens surface). Water contact angles are measured to determine the coating durability.

Other Instrumentation:

1H-NMR spectroscopic investigations are performed with a Bruker Avance 400 NMR spectrometer. For UV-Vis spectroscopic studies a Perkin Elmer Lambda 25 spectrometer is utilized. Lens spectra are recorded in a quartz cuvette (length: 1 cm) in a PBS solution (pH=7.0). The spectra of the package solutions are recorded as taken out of the package in quartz cuvettes (length also 1 cm).

Example 1

Preparation of CE-PDMS Macromer

In the first step, α,ω-bis(2-hydroxyethoxypropyl)-polydimethylsiloxane (Mn=2000, Shin-Etsu, KF-6001a) is capped with isophorone diisocyanate (IPDI) by reacting 49.85 g of α,ω-bis(2-hydroxyethoxypropyl)-polydimethylsiloxane with 11.1 g IPDI in 150 g of dry methyl ethyl ketone (MEK) in the presence of 0.063 g of dibutyltindilaurate (DBTDL). The reaction is kept for 4.5 h at 40° C., forming IPDI-PDMS-IPDI. In the second step, a mixture of 164.8 g of α,ω-bis(2-hydroxyethoxypropyl)-polydimethylsiloxane (Mn=3000, Shin-Etsu, KF-6002) and 50 g of dry MEK are added dropwise to the IPDI-PDMS-IPDI solution to which has been added an additional 0.063 g of DBTDL. The reactor is held for 4.5 h at about 40° C., forming HO-PDMS-IPDI-PDMS-IPDI-PDMS-OH. MEK is then removed under reduced pressure. In the third step, the terminal hydroxyl-groups are capped with methacryloyloxyethyl groups by addition of 7.77 g of isocyanatoethylmethacrylate (IEM) and an additional 0.063 g of DBTDL, forming IEM-PDMS-IPDI-PDMS-IPDI-PDMS-IEM (i.e., CE-PDMS terminated with methacrylate groups).

Preparation of Lens Formulations

A lens formulation is prepared by dissolving components in 1-propanol to have the following composition: 33% by weight of CE-PDMS macromer prepared in this example, 17% by weight of N-[tris(trimethylsiloxy)-silylpropyl]acrylamide (TRIS-Am), 24% by weight of N,N-dimethylacrylamide (DMA), 0.5% by weight of N-(carbonyl-methoxypolyethylene glycol-2000)-1,2-disteaoyl-sn-glycero-3-phosphoethanolamin, sodium salt) (L-PEG), 1.0% by weight Darocur 1173 (DC1173), 0.1% by weight of visitint (5% copper phthalocyanine blue pigment dispersion in tris(trimethylsiloxy)silylpropylmethacrylate, TRIS), and 24.5% by weight of 1-propanol.

Preparation of Lenses

Lenses are prepared by cast-molding from the lens formulation prepared above in a reusable mold, similar to the mold shown in FIGS. 1-6 in U.S. Pat. Nos. 7,384,590 and 7,387,759 (FIGS. 1-6). The mold comprises a female mold half made of $CaF_2$ and a male mold half made of PMMA. The UV irradiation source is a Hamamatsu lamp with the WG335+TM297 cut off filter at an intensity of about 4 $mW/cm^2$. The lens formulation in the mold is irradiated with UV irradiation for about 25 seconds.

Cast-molded lenses are demolded and used in examples hereinafter as so called "unextracted contact lenses of example 1".

Alternatively cast-molded lenses are extracted with isopropanol (or methyl ethyl ketone, MEK), rinsed in water, coated with polyacrylic acid (PAA) by dipping lenses in a propanol solution of PAA (0.1% by weight, acidified with formic acid to about pH 2.5), and hydrated in water. Resultant contact lenses having a reactive PAA-LbL base coating thereon are determined to have the following properties: ion permeability of about 8.0 to about 9.0 relative to Alsacon lens material; apparent Dk (single point) of about 90 to 100; a water content of about 30% to about 33%; and a bulk elastic modulus of about 0.60 MPa to about 0.65 MPa.

Example 2

Preparation of Poly(acrylic acid-co-Norbloc) (PAA-N20).

This example illustrates how to prepare a contact lens with a UV-absorbing coating thereon. Acrylic acid is supplied from Fluka (#017309111).

A UV-absorbing polymer of formula (2) (in which m:n~80:20), designated as PAA-N20, has a molecular weight of about 36 kD and comprises about 8.1% by mole of UV-absorbing monomeric units (Norbloc, [3-(2-H-Benzotriazol-2-yl)-4-hydroxyphenyl]ethyl methacrylate). It is prepared according to the procedures described below.

$$2$$

Into a 250 ml three-neck flask equipped with a N2-inlet tube, a condenser, a thermometer and a magnetic bar are placed a mixture of 8.00 g acrylic acid (111 mmol; Fluka #017309111), 2.00 g ([3-(2-H-benzotriazol-2-yl)-4-hydroxyphenyl]ethyl methacrylate (Norbloc 7966; 6.2 mmol; Aldrich #22,-705-6) and 100 ml of N,N-dimethylformamid (DMF; Aldrich, #227056). Through this solution nitrogen is conducted in order to free the solution from air. Then it is heated up to 60° C. while stirring and 0.5 ml of a DMF solution with 4% of dimethyl-2,2'-azobis-isobutyrate (V-601, Wako #927-14717) is added. The reaction mixture is kept at 60° C. by stirring over a period of 16 h, cooled down to ambient temperature and poured into 1.0 L of ethyl acetate. The resulting precipitate is separated by centrifugation (6000 $min^{-1}$, 30 min), re-dissolved in a slightly basic aqueous solution (pH=10.0, adjusted with sodium carbonate) and ultrafiltrated (3 kDa membrane, Millipore #P2PLBCV01; 15× volume exchange by water) against de-ionized water. After freeze-drying of the solution 7.0 g of a white, solid product is isolated.

$^1$H-NMR (400 MHz; D2O) δ: 0.8-3.15 (maxima at 1.06, 1.52, 1.62, 2.15, 2.57), 4.25, 6.5-8.1 ($H_{aromatic}$) ppm; all signals are unstructured and broad.

The mole percentage of Norbloc monomeric units in copolymer PAA-N20 is $X_{Norbloc}$=8.1 (Mol-%), based on 1H-NMR integration according to the following equation $$X_{Norbloc}[\text{Mol-}\%]=100\times[3\times A_{aromatic}/(7\times A_1-4\times A_{aromatic})]$$

in which $A_1$ is the integral of the area of the protons between 1.02-3, 15 ppm and $A_{aromatic}$ is the integral of the area of the aromatic signals between 6.5-8.15 ppm.

UV-Vis absorbance (PBS solution at pH 7.0): Two maxima with absorption coefficients $\varepsilon_1$ (299 nm)=9.09 and $\varepsilon_2$ (329 nm)=8.86 [l/(g×cm)].

Molecular weight by GPC (PSS Suprema columns with 30 Å and 1000 Å pore size; PBS solution as eluent; Na-Poly (acrylic acid) as calibration standards): Mw=36 kDa.

Preparation of a PAA-N20 Coated Contact Lens

An unextracted contact lens of example 1 is dipped in a solution of PAA-N20 (0.36 g/L PAA-N20 dissolved in 1-propanol, pH adjusted with HCOOH to about 2.0) for about 30 minutes and then rinsed with and stored in an aqueous phosphate buffered saline (PBS) solution. The UV spectrum of the resultant contact lens with PAA-N20 coating thereon clearly shows that the light transmission of the lens is efficiently blocked in the UV-B- and UV-A region (i.e. the region between 280 nm and 380 nm).

Example 3

Preparation of PAA-N20-Irg:

1.00 g (14 mmol) PAA-N20 (Mw=36 kD; prepared according to the example hereinbefore are dissolved in 75 ml water by stirring. To this solution are added at ambient temperature 2 ml each of an aqueous solution of 1-(3-Dimethylaminopropyl)-3-ethylcarbodiimid-hydrochlorid (w=23%, EDC-HCl; Fluka #03450), N-Hydroxysulfo-succinimid-Na salt (w=24%; NHS; Aldrich #341851) and after 15 min 1.48 g (5.7 mmol) of solid 2-hydroxy-2-methyl-1-[4-(2-hydroxethylamino) ethoxy]phenyl-1-propanone (Irgacure-amine; prepared according to WO 03/042724, example A-1, page 24). After the Irgacure-amine is completely dissolved the pH of the solution is adjusted to 9.0 by a 1N aqueous NaOH solution. After 21 h the clear solution is neutralized with 1N hydrochloric acid, ultra filtrated (1 kD membrane, Millipore #P2PLACV01, 10× volume exchange by water) against de-ionized water and concentrated. After freeze-drying of the resulting solution 1.19 g of a white, solid material is isolated.

$^1$H-NMR (400 MHz, D$_2$O) δ: 0.9-2.6 (maxima at 1.00, 1.45, 1.61, 1.81, 2.11, 2.52), 2.81 (s; corresponds to EDC-HCl: —N(C$\underline{H}_3$), 2.97-3.17, 3.23, 3.46, 3.77, 3.83, 3.9-4.3 (maxima at 4.20 and 4.27), 6.7-7.8 (maxima at 6.87 and 6.89, $H_{aromatic}$), 7.91 (d, corresponds to Irgacure-amin: $H_{aromatic}$).

1-H-NMR integration delivers the following composition for polymer PAA-N20-Irg: 77 mol-% repeating units with acrylic acid moieties, 8 mol-% with Norbloc, 7 mold-% with photoinitiator and 8 mol-% moieties with EDC as origin.

UV-Vis absorbance (PBS solution at pH 7.0): two maxima with absorption coefficients $\varepsilon_1$ (287 nm)=10.81 [l/(g×cm)] and $\varepsilon_2$ (327 nm)=6.46 [l/(g×cm)].

Molecular weight by GPC (PSS Suprema columns with 30 Å and 1000 Å pore size; PBS solution as eluent, Na-Polyacrylic acid as calibration standards): $M_w$=34 kD.

Example 4

Preparation of PAA-N75-V15:

2.54 g (35.2 mmol) acrylic acid, 0.86 g (2.7 mmol) Norbloc 7966 and 2.28 g (5.0 mmol) 4-(2-hydroxy-2-methyl propanoyl)phenoxy ethyl 2-(2-propenyl-amino)-2-methyl propanoate [VDM; preparation: G. N. Babu et. al., ACS Polymer Preprints, 38 (1997), 510] together with 63 ml N,N-dimethylformamid (Sigma-Aldrich #227056) are placed in a flask. Through this solution argon is conducted in order to free the solution from air. Then it is heated up to 60° C. by stirring and 0.008 g (0.03 mmol) dimethyl-2,2'-azobisisobutyrate (V-601, Wako #927-14717) added. The reaction mixture is kept by stirring at 60° C. over a period of 16 h. Then 50 ml of the DMF is removed by vacuum distillation and the residual solution is poured in 200 ml ethyl acetate. The resulting precipitate is separated by centrifugation, re-dissolved in a slightly basic aqueous solution (pH=10.0, adjusted with sodium bicarbonate) and ultrafiltrated (1 kDa membrane, Millipore #P2PLACV01; 10× volume exchange by water) against de-ionized water. After freeze-drying of the solution 1.41 g of a white, solid material are isolated.

1-H-NMR (400 MHz, D2O) δ: 0.5-3.2 (maxima at 1.04, 1.40, 1.70, 2.17, 2.56, 2.77), 3.7-4.5 (maxima at 4.21; corresponds to O—C$\underline{H}_2$C$\underline{H}_2$—O of VDM and —CH$_2$C$\underline{H}_2$—O of Norbloc), 6.25-8.25 (maxima at 7.01, 7.35, 8.17; corresponds to 4$H_{aromatic}$ of VDM and 7$H_{aromatic}$ of Norbloc).

1-H-NMR integration delivers the following composition for polymer PAA-N75-V15: 75 mol-% with acrylic acid moieties, 15 mol-% with Norbloc, 10 mol-% with photoinitiator. Thus PAA-N75-V15 can be characterized by the following formula 2

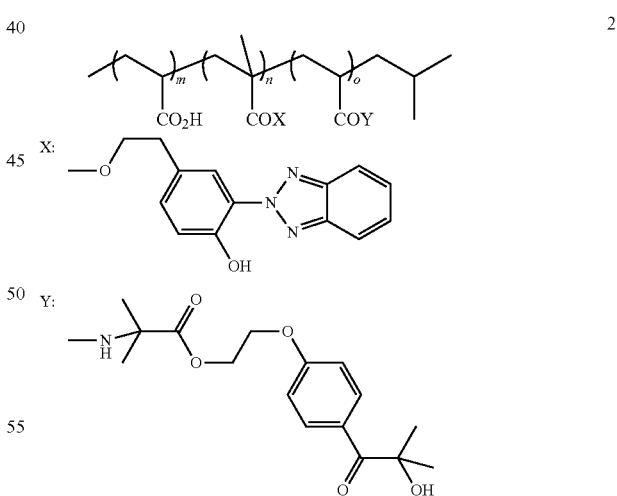

2 wherein the ratio of m:n:o is 75:15:10.

UV-Vis absorbance (PBS solution at pH 7.0): two maxima with absorption coefficients $\varepsilon_1$ (294 nm)=13.83 [l/(g×cm)] and ε2 (334 nm)=11.27 [l/(g×cm).

Molecular weight by GPC [PSS Suprema columns with 30 Å and 1000 Å pore size; PBS solution as eluent. Na-Polyacrylic acid as calibration standards): $M_w$=6.2 kD.

Example 5

Preparation of a Blue-Light Absorber with Photoinitiator:
Preparation of PAA-L20-IA15:

2.04 g (27.7 mmol) acrylic acid, 0.77 g (S)-2-methacryloyl-oxymethyl-1-(4-nitrophenyl)pyrrolidine (1.6 mmol; prepared according to M. Yoshida et. Al.; *Makromol. Chem. Rapid Commun.*, 10, (1989), 517), 1.14 g acrylic acid 2-[4-(2-hydroxy-2-methylpropionyl)phenoxy]ethyl ester (4.1 mmol; prepared according to WO 2010/0635355, page 24) together with 40 ml N,N-dimethylformamid (Sigma-Aldrich #227056) are placed in a flask. Through this solution nitrogen is conducted in order to free the solution from air. Then it is heated up to 60° C. by stirring and 0.006 g (0.02 mmol) dimethyl-2,2'-azobisisobutyrate (V-601, Wako #927-14717) added. The reaction mixture is kept by stirring at 60° C. over a period of 18 h. Then the solution is poured in 400 ml ethyl acetate. The resulting precipitate is separated by centrifugation, re-dissolved in a slightly basic aqueous solution (pH=10.0, adjusted with sodium bicarbonate) and ultra-filtrated (1 kDa membrane, Millipore #P2PLACV01; 10× volume exchange by water) against de-ionized water. After freeze-drying of the solution 0.82 g of a yellow, solid material is isolated.

1-H-NMR (400 MHz, D2O) δ: 0.5-2.7 (maxima at 1.00, 1.45, 2.00, 2.50), 2.8-3.65 (maxima at 3.24, 3.57; corresponds to 4 protons of pyrrolidine ring of the "blue light" absorber), 3.7-4.6 (maxima at 4.18, 4.36), 6.1-8.2 (maxima at 6.47, 6.78, 7.06, 7.87, 8.04; corresponds to $4H_{aromatic}$ of photoinitiator subunit and $4H_{aromatic}$ of blue-light absorber).

1-H-NMR integration delivers the following composition for polymer PAA-L20-IA15: 85 mol-% with acrylic acid moieties, 9 mol-% with blue-light absorber, 6 mol-% with photoinitiator. Thus PAA-L20-IA15 can be characterized by the following formula 4

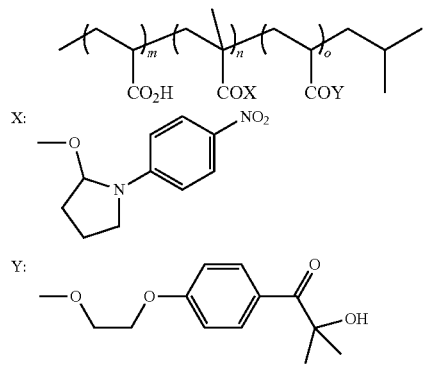

wherein the ratio of m:n:o is 85:9:6.

UV-Vis absorbance (PBS solution at pH 7.0): three maxima with absorption coefficients $\varepsilon_1$ (223 nm)=8.31 [l/(g×cm,)], $\varepsilon_2$ (277 nm)=8.22 [l/(g×cm)] and $\varepsilon_2$ (415 nm)=10.43 [l/(g×cm). Molecular weight by GPC [PSS Suprema columns with 30 Å and 1000 Å pore size; PBS solution as eluent. Na-Polyacrylic acid as calibration standards): $M_w$=22.2 kD.

Example 6

Manufacture of Dipping Solution and Dipping Process
Dipping Solutions:

The PAA-N20 dipping solution is prepared by dissolving PAA-N20 (0.36%) in a mixture of 1-Propanol/water (4%) and acidification to pH=2 by addition of formic acid.

The PAA-N20-Irg dipping solution is prepared by dissolving of PAA-N20-Irg (0.36%) in EtOH and acidification of the solution to pH=2 by addition of an ethanolic solution of hydrochloric acid (Fluka #17934).

The PAA-N75-V15 dipping solution is prepared by dissolving of PAA-N75-V15 (0.36%) in 1-propanol and acidification of the solution to pH=2.0 by addition of an propanolic solution of hydrochloric acid (Fluka #17933).

The PAA-L20-IA15 dipping solution is prepared by dissolving of PAA-L20-IA15 (0.36%) in 1-propanol and acidification of the solution to pH=2.0 by addition of an propanolic solution of hydrochloric acid.

Dipping Process:

Unextracted contact lenses of Example 1 lenses are placed in a holder and treated with the appropriate dipping solutions. The treatment is stopped after the lenses show in their UV spectrum (recorded in PBS solution) at 315 nm (local minimum) a UV absorbance (A)≥2. The lenses are then rinsed with de-ionized water (6 min) and subsequently with a PBS solution (1 min).

Example 7

UV-Post Treatment Process of Lenses/Photo Induced Grafting:

All steps are performed under a $N_2$ atmosphere. Into a quartz cuvette with an unextracted contact lens of Example 1 treated with the appropriate dipping solutions according example 6 is poured the appropriate UV treatment solution (see hereinafter) (approximately 1.5 ml/lens). After 5 minutes the lens is illuminated for 5 minutes by two light wave guides, vertically arranged to the lens surface, but oppositely to each other with UV light (intensity: 5.8 mW/cm2 per light wave guide) from a Hamamatsu UV light source equipped with a 328 nm edge filter. Then the lens is taken out of the curing solution, rinsed with water, packed together with a PBS storage solution in a PP shell, closed by a foil and autoclaved.

As UV-treatment solutions are used i) a PBS solution (pH=7.0), ii) a PBS buffered (pH=7.0) aqueous solution of poly(ethylene glycol)-diacrylate (PEG-DA 700; 10%; $M_n$=700 D; Aldrich #455008, iii) a PBS buffered (pH=7.0) aqueous solution of poly(ethylene glycol)-methylether methacrylate (PEG-MEMA 950; 10%; $M_n$=950; Aldrich #447951) and iv) a PBS buffered (pH=7.0) aqueous solution of polyvinyl alcohol of formula 3 hereinafter (PVA; 10%; preparation according to example 2 in WO 02/071106)

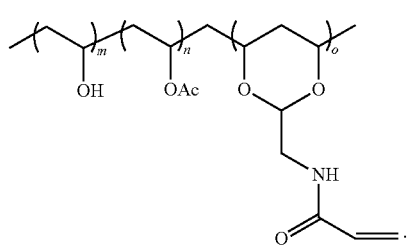

Example 8

Unextracted contact lenses of Example 1 are treated with the PAA-N20 dipping solution according example 6 and UV treated in a PBS solution according example 7. The UV spectrum of the corresponding PBS storage solution is disclosed in FIG. 1, absorption line designated as 1).

Example 9

Unextracted contact lenses of Example 1 are treated with the PAA-N20-Irg dipping solution according example 6 and UV illuminated in a PBS solution according example 7. The UV spectrum of the corresponding PBS storage solution is disclosed in FIG. 1, absorption line designated as 2).

Example 10

Unextracted contact lenses of Example 1 are treated with the PAA-N20-Irg solution according example 6 and UV illuminated according example 7 in the PEG-DA 700 solution. The UV spectrum of the corresponding PBS storage solution is disclosed in FIG. 1, absorption line designated as 3).

It is evident from FIG. 1 that there is substantial remigration of UV absorbing polymer from a lens of example 8. Said remigration is reduced by lenses obtained according to the method of the invention. The lens of example 9 demonstrates this in connection with FIG. 1. Despite similar molecular masses of the UV absorbing polymers with and without UV photoinitiator is the UV absorbance of the storage solution of a lens of example 9 significantly lower than that of a lens of example 8. A complete blocking of the UV absorbing functionalized copolymer in the lens is achieved with a lens of example 10 which is irradiated in a solution of PEG-DA 700. After autoclaving of the lens no signals are detected in the UV spectrum of its storage solution which belongs to remigrated (leached) UV absorbing polymer.

Example 11

Untreated lenses for comparison purposes (these are unextracted contact lenses of Example 1, then extracted but not dip-coated or treated otherwise).

Example 12

Unextracted contact lenses of Example 1 are treated for 20 minutes with the PAA-N20-Irg dipping solution according example 6 and UV illuminated according example 7 in the PVA solution. The ATR-FTIR spectrum of such treated lenses shows signals which correspond to PVA.

Example 13

Unextracted contact lenses of Example 1 are treated for 15 minutes with the PAA-N75-V15 solution according example 6 and UV illuminated in a PBS solution according example 7.

Example 14

Unextracted contact lenses of Example 1 are treated for 15 minutes with the PAA-N75-V15 solution according example 6 and UV illuminated according example 7 in the PEG-DA700 solution. The ATR-FTIR spectrum of such treated lenses shows signals which correspond to PEG-DA 700.

Example 15

Unextracted contact lenses of Example 1 are treated for 15 minutes with the PAA-N75-V15 solution according example 6 and UV illuminated according example 7 in the PEG-MEMA 950 solution. The ATR-FTIR spectrum of such treated lenses shows signals which correspond to PEG-MEMA 950

Example 16

Unextracted contact lenses of Example 1 are treated for 15 minutes with the PAA-N75-V15 solution according example 6 and UV illuminated according example 7 in the PVA solution. ATR-FTIR spectrum of such treated lenses shows signals which correspond to PVA.

Example 17

This is a control experiment in order to verify that a PAA-Norbloc copolymer without UV initiator functionality is not able to graft a hydrophilic polymer by UV treatment: Unextracted contact lenses of Example 1 are treated for 15 minutes with the PAA-N20 solution according example 6 and UV illuminated according example 7 in the PVA solution. The increase of water contact angle at a pH=2.0 from 16° to 92° as well as the complete staining of lenses at pH=2.0 by Sudan Black indicate the absence of a PVA layer. This observation is also confirmed by ATR-FTIR measurements: signals corresponding to PVA are not detectable. This means that the grafting of the reactive coating is not initiated by the UV absorber containing poly acrylic acid polymer alone, but for a successful grafting the presence of a photoinitiator on the polymer is necessary.

Example 18

This experiment demonstrates that the disclosed coating process works also with a silicon hydrogel lens with a macromer as bulk lens material. A macromer lens produced according example 2ia-id of WO 2008/074838 is treated for 25 minutes with the PAA-N75-V15 solution according example 6 and UV illuminated according example 7 in the PVA solution.

Example 19

Preparation of a lens with UV- and blue-light absorber and post curing in the presence of PVA of formula 3. Unextracted contact lenses of Example 1 are treated according example 6 firstly for 15 minutes with the PAA-N75-V15 solution and secondly for 15 minutes with the PAA-L20-IA15 solution. The so treated lenses are then UV illuminated according example 7 in the PVA solution. The resulting lenses have an intense yellow color. This is reflected also in its UV spectrum which shows zero transmission down to a wave length of approx. 420 nm. The ATR-FTIR spectrum of an such treated lens shows signals which correspond to PVA.

Table 1:

Water contact angle and Sudan Black staining test of lenses out off package and i) rinsing with water (pH=7.0) and ii) rinsing with acidified water of pH=2.0.

TABLE 1

|  | Water Contact Angle (°) | | Sudan Black Staining Test (wet)* | |
| --- | --- | --- | --- | --- |
|  | pH = 7.0 | pH = 2.0 | pH = 7.0 | pH = 2.0 |
| Example 8 (PAA-N20) | 15 | 106 | 0 | 2 |
| Example 9 (PAA-N20-Irg, hv) | 13 | 103 | 0 | 2 |

TABLE 1-continued

| | Water Contact Angle (°) | | Sudan Black Staining Test (wet)* | |
|---|---|---|---|---|
| | pH = 7.0 | pH = 2.0 | pH = 7.0 | pH = 2.0 |
| Example 10 (PAA-N20-Irg, PEG-DA 700, hv) | 43 | 52 | 1 | 1 |
| Example 11 (Control: Lens untreated) | 103 | — | 2 | 2 |
| Example 12 (PAA-N20-Irg, PVA, hv) | 10 | 50 | 0 | 0 |
| Example 13 (PAA-N75-V15, hv) | 75 | 91 | 1 | 2 |
| Example 14 (PAA-N75-V15, PEG-DA 700, hv) | 10 | 47 | 0 | 0 |
| Example 15 (PAA-N75-V15, PEG-MEMA 950, hv) | 10 | 37 | 0 | 1 |
| Example 16 (PAA-N75-V15, PVA, hv) | 10 | 45 | 0 | 0 |
| Example 17 (PAA-N20, PVA, hv) | 16 | 92 | 0 | 2 |
| Example 18 (macromer lens, N75-V15, PVA, hv) | 13 | 44 | 0 | 0 |
| Example 19 (PAA-N75-V15, PAA-L20-IA15, PVA, hv) | 10 | 22 | 0** | 0** |

*)Evaluations: 0: no; 1: slightly; 2: complete staining of a lens by the Sudan Black solution
**)Due to the intense yellow color of the lens a Sudan Black stained lens appears green and not blue!

Example 20

Procedure to determine lens extractables: 20 lenses each with examples as listed hereinafter are removed from their package, placed in a glass flask and rinsed with water as long as the inorganic salts of the PBS buffer were removed. The lenses are then dried, weighted ($m_o$), provided with 2-propanol (40 ml; Fluka, #34965) and placed on a lab shaker. After 4 h treatment at ambient temperature the extraction solution is completely removed and the lenses several times rinsed with fresh 2-Propanol. The lenses are again dried and weighted ($m_e$). The extractables are calculated according to Extractables=100×($m_o$−$m_e$)/$m_o$ [weight % of lenses].

TABLE 2

| Lens extractables | | |
|---|---|---|
| | Extractables (weight % of lenses) | Relative Change of Extractables (%) |
| Example 8 (PAA-N20) | 7.5 | 100 |
| Example 9 (PAA-N20-Irg, hv) | 4.8 | 64 |
| Example 10 (PAA-N20-Irg, PEG-DA 700, hv) | 1.7 | 23 |
| Example 13 (PAA-N75-V15, hv) | 1.8 | 24 |
| Example 16 (PAA-N75-V15, PVA, hv) | 2.5 | 33 |

Example 21

The UV absorbance of PBS storage solutions at 329 nm is measured (the absorbance at 329 nm corresponds with Norbloc containing compounds released/re-migrated from the lens in the storage solution after autoclaving and storage; the higher the absorbance, the higher the unwanted release)

TABLE 3

| UV absorbance | |
|---|---|
| | UV-Absorbance[x] |
| Example 8 (PAA-N20) | 1.66 |
| Example 9 (PAA-N20-Irg, hv) | 0.33 |
| Example 10 (PAA-N20-Irg, PEG-DA 700, hv) | 0.00 |
| Example 12 (PAA-N20-Irg, PVA, hv) | 0.12 |
| Example 13 (PAA-N75-V15, hv) | 0.58 |
| Example 14 (PAA-N75-V15, PEG-DA 700, hv) | 0.07 |
| Example 15 (PAA-N75-N15, PEG-MEMA 950, hv) | 0.11 |
| Example 16 (PAA-N75-V15, PVA, hv) | 0.06 |
| Example 17 (PAA-N20, PVA, hv) | 1.28 |
| Example 18 (macromer lens, N75-V15, PVA, hv)h | 0.20 |
| Example 19 (PAA-N75-V15, PAA-L20-IA15, PVA, hv) | 0.27 |

[x]UV-Absorbance values are uncorrected

What is claimed:

1. A method for producing UV-absorbing contact lenses, comprising the steps of:
    (1) obtaining an ophthalmic lens;
    (2) dipping the ophthalmic lens in a coating solution comprising an organic solvent and a UV-absorbing polymer for a period of time sufficient to form a UV-absorbing coating on the ophthalmic lens, wherein the coating solution comprises at least about 60% by weight of the organic solvent, wherein the UV-absorbing polymer comprises
        a) UV-absorbing monomeric units,
        b) covalently bound radical-initiating moieties,
        c) and at least 50% by mole of carboxyl-containing monomeric units of at least one carboxyl-containing vinylic monomer selected from the group consisting of acrylic acid, $C_1$-$C_{12}$ alkylacrylic acid, N,N-2-acrylamidoglycolic acid, beta-methyl-acrylic acid (crotonic acid), alpha-phenyl acrylic acid, beta-acryloxy propionic acid, sorbic acid, angelic acid, cinnamic acid, 1-carobxy-4-phenyl butadiene-1,3, itaconic acid, citraconic acid, mesaconic acid, glutaconic acid, aconitic acid, maleic acid, fumaric acid, tricarboxy ethylene, and combinations thereof;
    (3) rinsing the ophthalmic lens having the UV-absorbing coating thereon with water or with a mixture of water and at most about 50% by weight of an organic solvent; and
    (4) irradiating, with a light source, the ophthalmic lens obtained in step (3) in the presence of a hydrophilic vinylic monomer or crosslinker to graft the UV-absorbing coating onto the ophthalmic lens.

2. The method of claim 1, wherein each UV-absorbing monomeric unit comprises a benzotriazole or benzophenone moiety or combination thereof.

3. The method of claim 2, wherein the UV-absorbing polymer is obtained from an intermediary UV-absorbing polymer obtained by copolymerizing a polymerizable mixture comprising the carboxyl-containing vinylic monomer and at least one UV-absorbing vinylic monomer in the presence or absence of a vinylic monomer, provided that the carboxyl-containing vinylic monomer is present in an amount of at least 60% by mole in the polymerizable composition.

4. The method of claim 3, wherein the UV-absorbing vinylic monomer is selected from the group consisting of 2-(2-hydroxy-5-vinylphenyl)-2H-benzotriazole, 2-(2-hydroxy-5-acrylyloxyphenyl)-2H-benzotriazole, 2-(2-hydroxy-3-methacrylamido methyl-5-tert octylphenyl) benzotriazole, 2-(2'-hydroxy-5'-methacrylamidophenyl)-5-chlorobenzotriazole, 2-(2'-hydroxy-5'-methacrylamidophenyl)-5-methoxybenzotriazole, 2-(2'-hydroxy-5'-methacryloxypropyl-3'-t-butyl-phenyl)-5-chlorobenzotriazole, 2-(2'-hydroxy-5'-methacryloxyethylphenyl) benzotriazole, 2-(2'-hydroxy-5'-methacryloxypropylphenyl) benzotriazole, 2-hydroxy-4-acryloxy alkoxy benzophenone, 2-hydroxy-4-methacryloxy alkoxy benzophenone, allyl-2-hydroxybenzophenone, and 2-hydroxy-4-methacryloxy benzophenone, and combinations thereof; wherein the carboxyl-containing vinylic monomer is selected from the group consisting of acrylic acid, $C_1$-$C_{12}$ alkylacrylic acid, N,N-2-acrylamidoglycolic acid, beta-methyl-acrylic acid (crotonic acid), alpha-phenyl acrylic acid, beta-acryloxy propionic acid, sorbic acid, angelic acid, cinnamic acid, 1-carobxy-4-phenyl butadiene-1,3, itaconic acid, citraconic acid, mesaconic acid, glutaconic acid, aconitic acid, maleic acid, fumaric acid, tricarboxy ethylene, and combinations thereof.

5. The method of claim 2, wherein the UV-absorbing polymer is obtained by: reacting a precursor polymer having at least 60% by mole of carboxyl-containing monomeric units, in a coupling reaction, simultaneously or sequentially with a UV-absorbing compound and a radical-initiating compound, wherein the UV-absorbing compound is represented by formula I, II, III, or IV

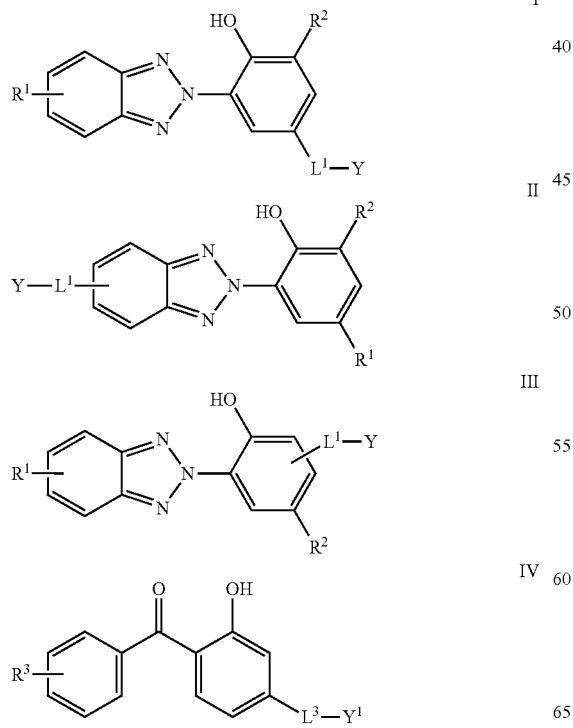

in which $R^1$, $R^2$ and $R^3$ independently of one other are hydrogen, a $C_1$-$C_{12}$ linear or branched alkyl group, a halogen (Cl or Br), a $C_6$ to $C_{24}$ aryl group, a $C_7$ to $C_{24}$ alkylaryl group, a $C_7$ to $C_{24}$ arylalkyl, or a $C_1$-$C_{12}$ linear or branched alkoxy group;

$L^1$ and $L^3$ independent of each other are a covalent bond or a divalent radical of $-X_a$-$E_1$-$X_b$-$E_2$-$X_c-$ in which $X_a$ is a covalent bond, $-O-$, carbonyl

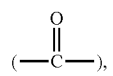

a divalent radical of $-(R^aO)_n-$ in which $R^a$ is a linear or branched $C_1$-$C_{12}$-alkylene and n is from 1 to 10,

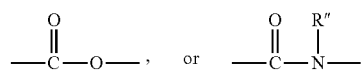

in which R" is H or $C_1$-$C_8$ alkyl, $E_1$ and $E_2$ independently of each other are a covalent bond, a divalent radical of $-(R^aO)_n-$ in which $R^a$ and n are defined above,

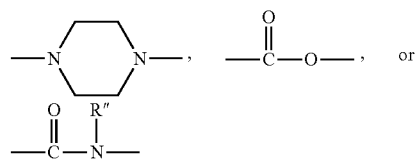

in which R" is H or $C_1$-$C_8$ alkyl, a $C_1$ to $C_{12}$ linear or branched alkylene divalent radical, a cycloalkyl divalent radical with up to 40 carbon atoms, an alkylcycloalkyl divalent radical with up to 40 carbon atoms, an alkylaryl divalent radical with up to 40 carbon atoms, an arylalkylene divalent radical with up to 40 carbon atoms, or a dicarbonyl group having the formula $-C(O)L^2C(O)-$ in which $L^2$ is a $C_1$ to $C_{12}$ linear or branched alkylene divalent radical or $-(R^{e1}-O)_{w1}-(R^{e2}-O)_{w2}-(R^{e3}-O)_{w3}-$, wherein $R^{e1}$, $R^{e2}$, and $R^{e3}$ independently of one another are a linear or branched $C_1$-$C_4$-alkylene and w1, w2 and w3 independently of one another are a number from 0 to 20 provided that the sum of (n+m+p) is 1 to 60, and $X_b$ and $X_c$ independently of each other are a covalent bond, carbonyl,

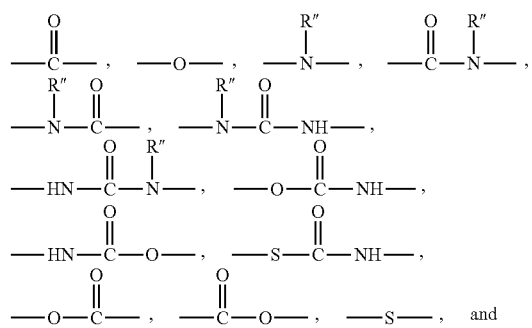

-continued

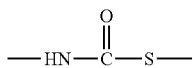

in which R″ is defined above; and

Y and $Y^1$ independent of each other are an azlactone group, an epoxy group, an isocyanate group, an aziridine group, or an amino group of —NHR in which R is hydrogen or a $C_1$-$C_{20}$ unsubstituted or substituted, linear or branched alkyl group, wherein the radical-initiating compound has a functional group reactive with a carboxy group.

6. The method of claim 5, wherein the precursor polymer is: (1) a homopolymer of acrylic acid or $C_1$-$C_{12}$ alkylacrylic acid; (2) a copolymer of acrylic acid and $C_1$-$C_{12}$ alkylacrylic acid; (3) a copolymer of a carboxyl-containing vinylic monomer which is acrylic acid or $C_1$-$C_{12}$ alkylacrylic or combination thereof and an amino-containing vinylic monomer selected from the group consisting of amino-$C_2$-$C_6$ alkyl (meth)acrylate, $C_1$-$C_6$ alkylamino-$C_2$-$C_6$ alkyl (meth)acrylate, allylamine, vinylamine, amino-$C_2$-$C_6$ alkyl (meth)acrylamide, $C_1$-$C_6$ alkylamino-$C_2$-$C_6$ alkyl (meth)acrylamide), and combination thereof; (4) a copolymer of a carboxyl-containing vinylic monomer which is acrylic acid or $C_1$-$C_{12}$ alkylacrylic or combination thereof and one or more hydrophilic vinylic monomers being free of carboxyl or amino group and selected from the group consisting of acrylamide, methacrylamide N,N-dimethylacrylamide, N,N-dimethyl methacrylamide, N-vinylpyrrolidone, N, N,-dimethylaminoethylmethacrylate, N,N-dimethylaminoethylacrylate, N,N-dimethylaminopropyl methacrylamide, N,N-dimethylaminopropylacrylamide, glycerol methacrylate, 3-acryloylamino-1-propanol, N-hydroxyethyl acrylamide, N-[tris(hydroxymethyl) methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 2-hydroxyethyl (meth) acrylate, hydroxypropyl (meth)acrylate, $C_1$-$C_4$-alkoxy polyethylene glycol (meth)acrylate having a weight average molecular weight of up to 1500 Daltons, N-vinyl formamide, N-vinyl acetamide, N-vinyl isopropylamide, N-vinyl-N-methyl acetamide, allyl alcohol, vinyl alcohol, and combinations thereof.

7. The method of claim 5, wherein the precursor polymer is polyacrylic acid, polymethacrylic acid, poly($C_2$-$C_{12}$ alkylacrylic acid), poly(acrylic acid-co-methacrylic acid), poly[$C_2$-$C_{12}$ alkylacrylic acid-co-(meth)acrylic acid], poly(N,N-2-acrylamidoglycolic acid), poly[(meth)acrylic acid-co-acrylamide], poly[(meth)acrylic acid-co-vinylpyrrolidone], poly[$C_2$-$C_{12}$ alkylacrylic acid-co-acrylamide], poly[$C_2$-$C_{12}$ alkylacrylic acid-co-vinylpyrrolidone], hydrolyzed poly[(meth)acrylic acid-co-vinylacetate], hydrolyzed poly[$C_2$-$C_{12}$ alkylacrylic acid-co-vinylacetate], or combinations thereof.

8. The method of claim 3, wherein the organic solvent is present in an amount of at least 70% by weight in the coating solution, wherein the ophthalmic lens having the UV-absorbing coating thereon is rinsed with a mixture of water and at most 50% by weight of an organic solvent.

9. The method of claim 4, wherein the organic solvent is present in an amount of at least 70% by weight in the coating solution, wherein the ophthalmic lens having the UV-absorbing coating thereon is rinsed with a mixture of water and at most 50% by weight of an organic solvent.

10. The method of claim 5, wherein the organic solvent is present in an amount of at least 70% by weight in the coating solution, wherein the ophthalmic lens having the UV-absorbing coating thereon is rinsed with a mixture of water and at most 50% by weight of an organic solvent.

11. The method of claim 6, wherein the organic solvent is present in an amount of at least 70% by weight in the coating solution, wherein the ophthalmic lens having the UV-absorbing coating thereon is rinsed with a mixture of water and at most 50% by weight of an organic solvent.

12. The method of claim 7, wherein the organic solvent is present in an amount of at least 70% by weight in the coating solution, wherein the ophthalmic lens having the UV-absorbing coating thereon is rinsed with a mixture of water and at most 50% by weight of an organic solvent.

13. The method of claim 2, wherein the organic solvent is present in an amount of at least 70% by weight in the coating solution, wherein the ophthalmic lens having the UV-absorbing coating thereon is rinsed with a mixture of water and at most 50% by weight of an organic solvent.

14. The method of claim 13, wherein the covalently bound radical-initiating moieties are derived from a functionalized radical-initiating compound which comprises a group which is co-reactive to carboxy group.

15. The method of claim 14, wherein the radical-initiating part belongs to the thioxanthone type or to the benzoin type.

16. The method of claim 15, wherein the covalently bound radical-initiating moieties are derived from an Irgacure type photoinitiator.

17. The method of claim 16, wherein the covalently bound radical-initiating moieties are present in the UV-absorbing polymer from about 3 to about 15 mole percent.

18. The method of claim 1 wherein the UV-absorbing monomeric units are present in the UV-absorbing polymer from about 4 to about 15 mole percent.

19. The method of claim 1 wherein the irradiation after the dipping step is conducted in the presence of a hydrophilic vinylic crosslinker which is a poly(ethyleneglycol) diacrylate or an acrylamide-modified polyvinylalcohol.

20. The method of claim 1, wherein the UV-absorbing coating further comprises a blue light-absorbing polymer.

* * * * *